US011609355B2

(12) United States Patent
Oppert et al.

(10) Patent No.: US 11,609,355 B2
(45) Date of Patent: Mar. 21, 2023

(54) SYSTEM AND METHOD FOR GENERATING AN EARTH MODEL

(71) Applicant: Chevron U.S.A. Inc., San Ramon, CA (US)

(72) Inventors: Shauna Kaye Oppert, Houston, TX (US); Jose I. Adachi, Houston, TX (US); James E. Sabolcik, Kingwood, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 590 days.

(21) Appl. No.: 16/591,569

(22) Filed: Oct. 2, 2019

(65) Prior Publication Data
US 2020/0103549 A1 Apr. 2, 2020

Related U.S. Application Data

(60) Provisional application No. 62/739,900, filed on Oct. 2, 2018.

(51) Int. Cl.
G01V 99/00 (2009.01)
G06F 30/17 (2020.01)
(Continued)

(52) U.S. Cl.
CPC ............ *G01V 99/005* (2013.01); *G06F 30/17* (2020.01); *G06F 30/23* (2020.01); *G06F 2111/10* (2020.01)

(58) Field of Classification Search
CPC ....... G01V 99/005; G06F 30/23; G06F 30/17; G06F 2111/10
(Continued)

(56) References Cited

U.S. PATENT DOCUMENTS 5,563,949 A 10/1996 Bahorich et al.
5,570,106 A 10/1996 Viswanathan
(Continued)

FOREIGN PATENT DOCUMENTS

GB 2481444 A * 12/2011 ............... G01V 1/30
WO WO-2014201457 A1 * 12/2014 ............. B01D 33/03
WO WO-2016022301 A1 * 2/2016 ........... E21B 49/005

OTHER PUBLICATIONS

Athy_1930 (Density, Porosity, and Compaction of Sedimentary Rocks, Bulletin of the American Association of Petroleum Geologists , Jan. 1930) (Year: 1930).*
(Continued)

Primary Examiner — Brian S Cook

(57) ABSTRACT

Embodiments of generating a self-consistent earth model are provided. One embodiment comprises: a) building a structured geologic; b) generating a mineralogy volume; c) generating a porosity volume and a density volume; d) generating a pressure volume; e) generating a geophysical property volume comprising a P-wave velocity volume and a S-wave velocity volume, a relationship between P-wave velocity and S-wave velocity, or any combination thereof; f) generating mechanical elastic properties based on (i) a static to dynamic elastic property relationship and (ii) the geophysical property volume, the relationship between P-wave velocity and S-wave velocity, or any combination thereof; and g) performing mechanical earth modeling using the mechanical elastic properties, the density volume, and the pressure volume to generate a self-consistent earth model.

28 Claims, 29 Drawing Sheets

(51) Int. Cl.
G06F 30/23 (2020.01)
G06F 111/10 (2020.01)

(58) Field of Classification Search
USPC .......................................................... 703/2
See application file for complete search history.

(56) References Cited

U.S. PATENT DOCUMENTS

| | | | |
|---|---|---|---|
| 5,615,171 | A | 3/1997 | Hildebrand |
| 5,629,904 | A | 5/1997 | Kosloff et al. |
| 5,838,564 | A | 11/1998 | Bahorich et al. |
| 5,892,732 | A | 4/1999 | Gersztenkorn |
| 5,930,730 | A | 7/1999 | Marfurt et al. |
| 6,055,482 | A | 4/2000 | Sudhakar et al. |
| 6,092,026 | A | 7/2000 | Bahorich et al. |
| 6,430,508 | B1 | 8/2002 | Sudhakar et al. |
| 6,690,820 | B2 | 2/2004 | Lees et al. |
| 6,765,570 | B1 | 7/2004 | Cheung et al. |
| 6,819,628 | B2 | 11/2004 | Tal-Ezer |
| 6,820,043 | B2 | 11/2004 | Mallet et al. |
| 6,859,734 | B2 | 2/2005 | Bednar |
| 6,873,913 | B2 | 3/2005 | Choo et al. |
| 7,095,677 | B2 | 8/2006 | Canning |
| 7,123,258 | B2 | 10/2006 | Deny et al. |
| 7,295,929 | B2 | 11/2007 | Dulac et al. |
| 7,295,930 | B2 | 11/2007 | Dulac et al. |
| 7,328,139 | B2 | 2/2008 | Dulac et al. |
| 7,561,922 | B2 | 7/2009 | Cohen et al. |
| 7,584,056 | B2 | 9/2009 | Koren |
| 7,711,532 | B2 | 5/2010 | Dulac et al. |
| 7,844,402 | B2 | 11/2010 | Klein et al. |
| 8,688,425 | B2 | 4/2014 | Oppert et al. |
| 8,706,420 | B2 | 4/2014 | Oppert et al. |
| 2011/0098997 | A1* | 4/2011 | Pyrcz ................... G01V 99/005 703/10 |
| 2016/0124116 | A1 | 5/2016 | Souche et al. |

OTHER PUBLICATIONS

Ibrahim_1981 (On a Self-Consistent Representation of Earth Models, with an Application to the Computing of Internal Flattening, Physics Department Middle East Technical University Ankara, Turkey, Bull. Geod. 55 (1981) pp. 179-195) (Year: 1981).*
Athy, L.F.; "Density, Porosity, and Compaction of Sedimentary Rocks"; Bulletin of the American Association of Petroleum Geologists, vol. 14:1, (Jan. 1930), pp. 1-24.
Bowers, Glenn L.; "Pore Pressure Estimation from Velosity Data: Accounting for Overpressure Mechanisms Besides Undercompaction"; SPE Drilling & Completions, (Jun. 1995), pp. 89-95.
Castagna, J.P., et al.; "Relationships Between Compressional-Wave and Shear-Wave Velocities in Clastic Silicate Rocks"; Geophysics, vol. 50:4, (Apr. 1985), pp. 571-581.
Chapman, Richard E.; "Mechanics of Unlubricated Sliding"; Geological Society of America Bulletin, Part I, vol. 90, (Jan. 1979), pp. 19-28.
Dutta, N.C.; "Pressure Prediction from Seismic Data: Implications for Seal Distribution and Hydrocarbon Exploration and Exploitation in the Deepwater Gulf of Mexico"; NPF Special Publication No. 7, (1997), pp. 187-199.
Eaton, Ben A.; "The Equation for Geopressure Prediction from Well Logs"; 50th Annual Fall Meeting of the Society of Petroleum Engineers of AIME, SPE 5544, (1975), pp. 1-5, tables (3 pages) and drawings (3 pages).
Foster, J.B., et al.; "Estimation of Formation Pressures from Electrical Surveys-Offshore Louisiana"; Electrical Logging, (Feb. 1966), pp. 165-171.
Ham, Harold M.; "A Method of Estimating Formation Pressures from Gulf Coast Well Logs"; Transactions, Gulf Coast Association of Geological Societies, vol. XVI, (1966), pp. 185-194 with a chart (1 page).

Han, De-hua; "Effects of Porosity and Clay Content on Acoustic Properties of Sandstones and Unconsolidated Sediments"; (Oct. 1986), Dissertation, Stanford University, Title page, Table of Contents, Abstract (4 pages), pp. 1-50.
Han, De-hua; "Effects of Porosity and Clay Content on Acoustic Properties of Sandstones and Unconsolidated Sediments"; (Oct. 1986), Dissertation, Stanford University, pp. 51-107.
Han, De-hua; "Effects of Porosity and Clay Content on Acoustic Properties of Sandstones and Unconsolidated Sediments"; (Oct. 1986), Dissertation, Stanford University, pp. 108-164.
Han, De-hua; "Effects of Porosity and Clay Content on Acoustic Properties of Sandstones and Unconsolidated Sediments"; (Oct. 1986), Dissertation, Stanford University, pp. 165-219.
Hubbert, M. King, et al.; "Role of Fluid Pressure in Mechanics of Overthrust Faulting: I. Mechanics of Fluid-Filled Porous Solids and It's Application to Overthrust Faulting"; (1959), Bulletin of the Geological Society of America, vol. 70, pp. 115-166.
Raymer, L.L., et al.; "An Improved Sonic Transit Time-To-Porosity Transform"; (1980), SPWLA Twenty-First Annual Logging Symposium, pp. 1-13.
Swarbrick, Richard E., et al.; "Comparison of Overpressure Magnitude Resulting from the Main Generating Mechanisms"; (2002), pp. 1-12.
Brocher, Thomas M.; "Compressional and Shear Wave Velocity Versus Depth in the San Francisco Bay Area, California: Rules for USGS Bay Area Velocity Model 05.0.0"; (2005), Open-File Report 05-1317, pp. 1-58.
Brocher, Thomas M.; "Empirical Relations Between Elastic Wavespeeds and Density in the Earth's Crust"; (Dec. 2005), Bulletin of the Seismological Society of America, vol. 95, No. 6, pp. 2081-2092.
Brown, Robert J.S., et al.; "On the Dependence of the Elastic Properties of a Porous Rock on the Compressibility of the Pore Fluid"; (Aug. 1975), Geophysics, vol. 40, No. 4, pp. 608-616.
Castagna, J.P., et al.; "Relationships Between Compressional-Wave and Shear-Wave Velocities in Classic Silicate Rocks"; (Apr. 1985), Geophysics, vol. 50, No. 4, pp. 571-581, 25 Figs., 2 Tables.
Crook, Anthony J.L., et al.; "Towards and Integrated Restoration/Forward Geomechanical Modelling Workflow for Basin Evolution Prediction"; (2018), Oil & Gas Science and Technology, Rev. IFP Energies Nouvelles, vol. 73, No. 18, pp. 1-19.
Gallop, Jeremy; "Extended Walton Third-Order Elastic Coefficients Modified by an Anisotropic and Stress-Dependent Coordination Number"; (2013), Geophysics, vol. 78, No. 6, pp. D545-D-556, 9 Figs.
Gallop, Jeremy; "Perturbing Walton's Model for Unconsolidated Sands with Anisotropic Stresses"; (2012), SEG Las Vegas 2012 Annual Meeting, pp. 1-6.
Gardner, G.H.F., et al.; "Formation Velocity and Density—The Diagnostic Basics for Stratigraphic Traps"; (Dec. 1974), Geophysics, vol. 39, No. 6, pp. 770-780, 9 Figs, 3 Tables.
Melendez-Martinez, Jaime, et al.; "A Comparative Study of the Anisotropic Dynamic and Static Elastic Moduli of Unconventional Reservoir Shales: Implication for Geomechanical Investigations"; (2016), Geophysics, vol. 81, No. 3, pp. D245-D261, 14 Figs, 3 Tables.
Sayers, Colin M.; "Stress-Dependent Elastic Anisotropy of Sandstones"; (2002), Geophysical Prospecting, vol. 50, pp. 85-95.
Terzaghi, Karl; "Die Berechnung der Durchlässigkeitsziffer des Tones aus dem Verlauf der hydromechanischen Spannungserscheinungen"; (1923), Sitzungsberichte der Akademie der Wissenschaften in Wien, mathematisch-naturwissenschaftliche Klasse vol. 132, pp. 125-138.
Terzaghi, Karl; "Theoretical Soil Mechanics"; (1943), John Wiley and Sons, Inc., pp. i-xvii.
Thomsen, Leon; "Weak Elastic Anisotropy"; (Oct. 1986), Geohysics, vol. 51, No. 10, pp. 1954-1966, 5 Figs., 1 Table.
Wheeler, Harry E.; "Baselevel, Lithosphere Surface, and Time-Stratigraphy"; (Jul. 1964), Geological Society of America Bulletin, vol. 75, pp. 599-610, 2 Figs.
Wheeler, Harry E.; "Time-Stratigraphy"; (May 1958), Bulleting of the American Association of Petroleum Geologists, vol. 42, No. 5, pp. 1047-1063, 7 Figs.

(56) References Cited

OTHER PUBLICATIONS

Wyllie, M.R.J., et al; "An Experimental Investigation of Factors Affecting Elastic Wave Velocities in Porous Media"; (Jul. 1958), Geophysics, vol. XXIII, No. 3, pp. 459-493, 23 Figs.

Wyllie, M.R.J., et al; "Elastic Wave Velocities in Heterogeneous and Porus Media"; (Jan. 1956), Geophysics, vol. XXI, No. 1, pp. 41-70, 19 Figs.

Xu, Shiyu, et al.; "Modeling Elastic Properties in Carbonate Rocks"; (Jan. 2009), The Leading Edge, Special Section: Rock Physics, pp. 66-74.

Yale, D.P.; "Conversion of Dynamic Mechanical Property Calculations to Static Values for Geomechanical Modeling"; (2017), ARMA 17-0644, 11 pages, 4 Figs., 2 Tables.

Bowers, Glenn L.; "Pore Pressure Estimation From Velocity Data: Accounting for Overpressure Mechanisms Besides Undercompaction"; (Jun. 1995), SPE Drilling & Completion, pp. 89-95.

Cheng, C.H., et al.; "Dynamic and Static Moduli"; (Jan. 1981), Geophysical Research Letters, vol. 8, No. 1, pp. 39-42.

Eaton, Ben A.; "The Equation for Geopressure Prediction from Well Logs"; (1975), SPE 5544, pp. 1-5, 1 Table, 9 Figs.

Fjaer, Erling; "Static and Dynamic Moduli of a Weak Sandstone"; (2009), Geophysics, vol. 74, No. 2, pp. WA103-112, 18 Figs., 2 Tables.

Gassmann, F.; "Uber die Elastizitat Poroser Medien"; (1951), Vierteljahrsschrift der Naturforschenden Gesellschaft in Zurich, vol. 96, pp. 1-23.

Mitchum, R.M., Jr.; "Seismic Stratigraphy and Global Changes of Sea Level, Part II: Glossary of Terms Used in Seismic Stratigraphy"; (Jan. 1997), In: Payton, C.E. (Ed.), Seismic Stratigraphy—Applications to Hydrocarbon Exploration, vol. 26, A.A.P.G. Memoir, pp. 205-212.

Mouchei, Jean-Paul, et al.; "Abnormal Pressures While Drilling"; (1989), Editions Technip, Paris, Title (2 pages), Introduction (3 pages), Preface (2 pages), Table of Contents (4 pages); Chapters 1-2, pp. 9-61.

Mouchet, Jean-Paul, et al.; "Abnormal Pressures While Drilling"; (1989), Editions Technip, Paris; Chapter 3, pp. 63-158.

Mouchet, Jean-Paul, et al.; "Abnormal Pressures While Drilling"; (1989), Editions Technip, Paris; Chapter 3 (continued) through Chapter 4, pp. 159-229.

Mouchet, Jean-Paul, et al.; "Abnormal Pressures While Drilling"; (1989), Editions Technip, Paris; Chapter 5, pp. 231-246, Index Terms (16 pages).

Prioul, Romain, et al.; "Nonlinear Rock Physics Model for Estimation of 3D Subsurface Stress in Anisotropic Formations: Theory and Laboratory Verification"; (2004), Geophysics, vol. 69, No. 2, pp. 415-425, 9 Figs., 3 Tables.

Rubey, William W., et al.; "Role of Fluid Pressure in Mechanics of Overthrust Faulting"; (Feb. 1959), Bulletin of the Geological Society of America, vol. 70, pp. 167-206, 11 Figs.

Walton, K.; "The Effective Elastic Moduli of a Random Packing of Spheres"; (1987), J. Mech. Phys. Solids, vol. 35, No. 2, pp. 213-226.

Winkler, Kenneth W., et al.; "Measurements of Third-Order Elastic Constants in Rocks"; (Sep. 1996), J. Acoust. Soc. Am., vol. 100, No. 3, pp. 1392-1398.

S. Oppert et al., "Keynote 6: Time Lapse Seismic Modelling in Fractured Carbonate Reservoirs," EAGE GeoTech 2021, 1st EAGE Geophysical Monitoring Conference and Exhibition, Mar. 1-4, 2021, 5 pgs.

* cited by examiner

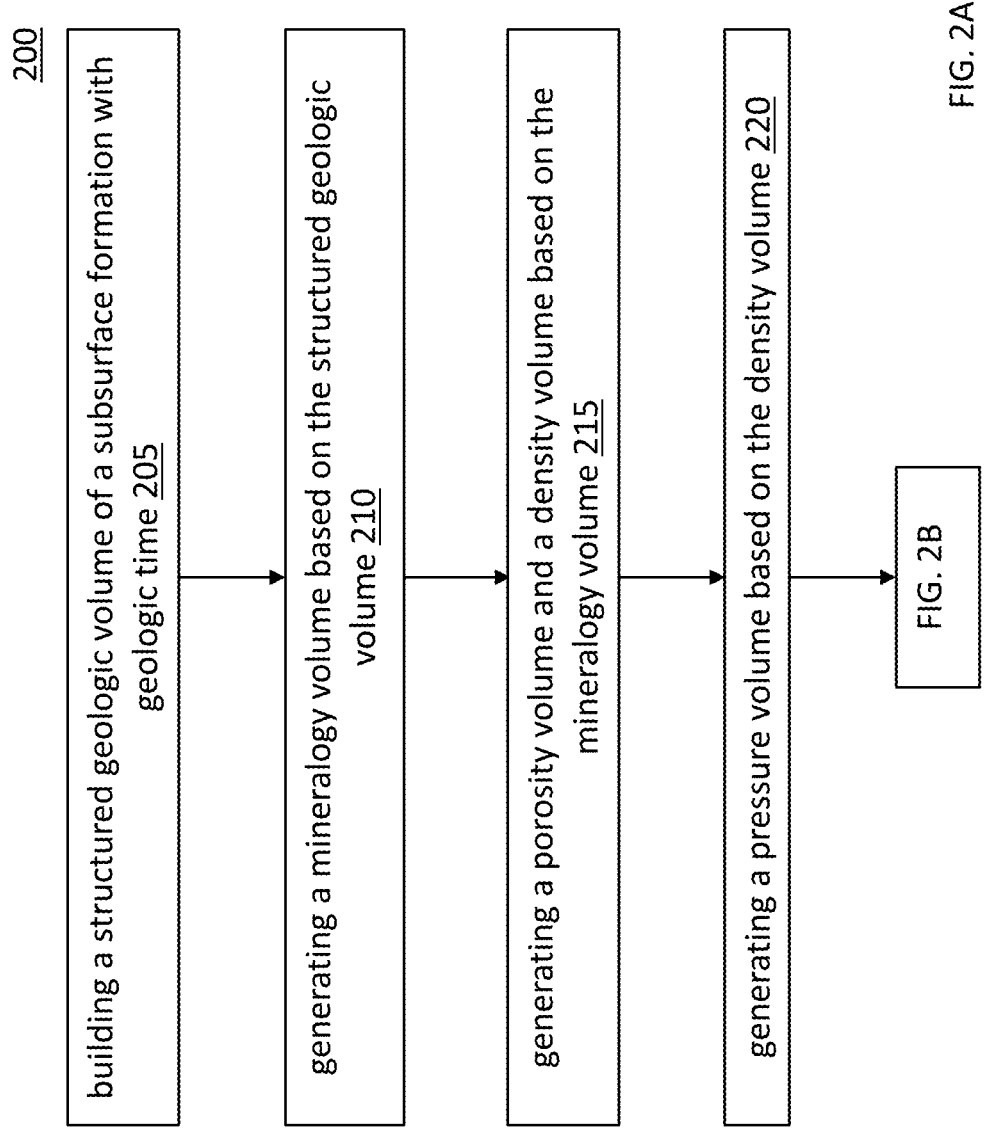

i. Compute normal hydrostatic pressure from the fluid density.

$P_{hyd}$ can be used as the Pore Pressure (step i) or one can continue generating additional detailed pressure volumes (steps ii-iii).

ii. Compute overburden pressure volume from the density volume.

iii. Compute pore pressure ($P_p$) using a designated method (e.g., Equivalent Depth, Eaton, etc.)

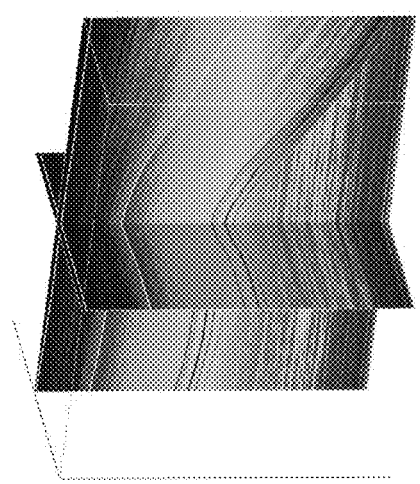
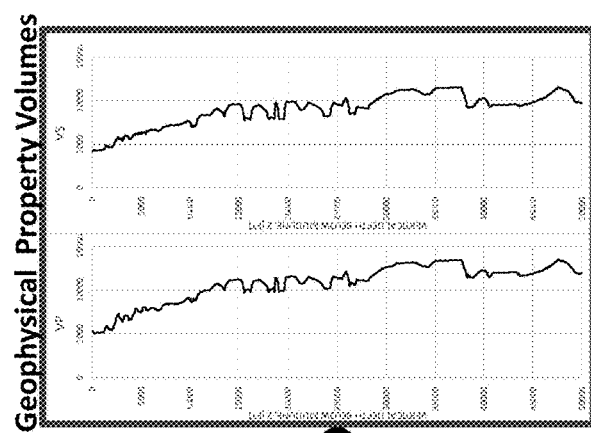
ii. Use Rock Physics Model, such as Gardner or Han methods, to generate Shear velocity (Vs) from density and porosity
i. Use Rock Physics Model, such as Hunt Raymer Gardner method, to generate P-wave velocity (Vp) from density and porosity
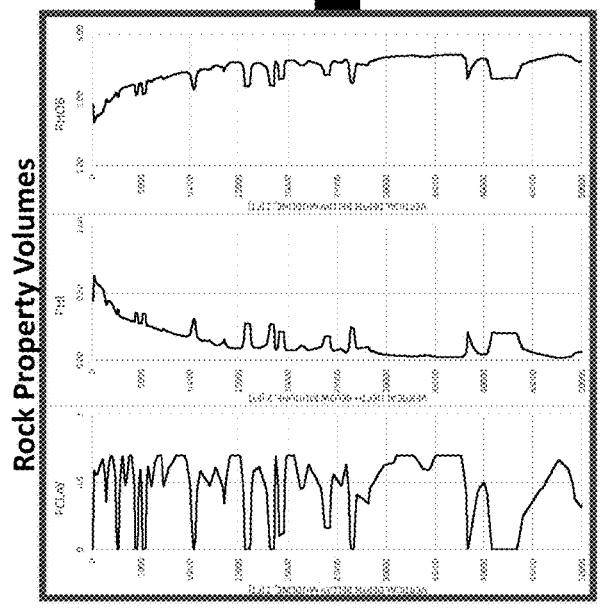
FIG. 3E

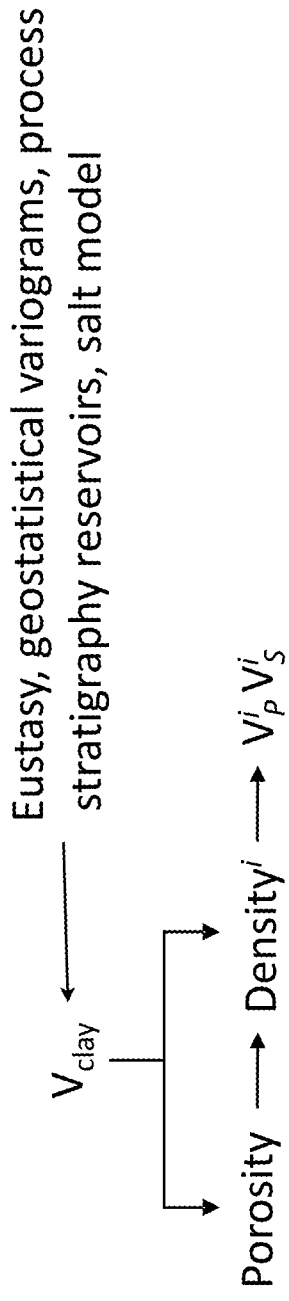

$V_{clay} \longrightarrow$

Porosity $\longrightarrow$ Density$^i \longrightarrow V_P^i, V_S^i$

Eustasy, geostatistical variograms, process stratigraphy reservoirs, salt model

Density is a function of $V_{clay}$, Sediment bulk density, formation water density (varies with depth), grain density, porosity, critical porosity, and initial sediment bulk density are at zero effective stress.

Initial water-filled Interval Compressional Velocity is a function of velocity at initial density, using Raymer, Hunt, and Gardner coefficients calibrated to analog Basin well data. Water-filled Interval Shear Velocity is calculated with both $V_{clay}$ and $V_P$, where sands are defined by the Han relationship and shales are calculated with the Castagna mudrock line.

FIG. 3F

Reservoir Flow Simulation Submodel

The 3D MEM resulting principal stresses can be used to calculate the mean effective compressive stress ($p'$) and von Mises deviatoric shear stress ($q$).

$$p' = \frac{1}{3}(\sigma_1' + \sigma_2' + \sigma_3') \quad \text{versus} \quad q = \sqrt{\frac{(\sigma_1'-\sigma_2')^2 + (\sigma_2'-\sigma_3')^2 + (\sigma_1'-\sigma_3')^2}{2}}$$

Assuming a critical state shear failure criterion and a yield surface description, the total porosity solution space can be represented on a plot of $p'$ versus $q$.

Example: Assuming a Mohr-Coulomb linear shear failure criterion based on a constant friction angle ($\varphi$), then slope of Critical State shear failure is:

$$M = \frac{6 \sin \varphi}{3 - \sin \varphi} \quad \text{(Could also use power law CS shear failure line)}$$

Assuming a Modified Cam-Clay (MCC) ellipsoidal yield surface:

$$p' = \frac{p_e' + \sqrt{{p_e'}^2 - 4\left(\frac{q}{M}\right)}}{2} \quad \text{(Could also use other various modified forms of MCC ellipsoidal surfaces)}$$

$p_e'$ is isotropic equivalent stress

Iso-porosity yield surfaces define stress state for a constant porosity at the onset of inelastic behavior.

Assumption that velocity is a proxy for porosity and therefore velocity varies with effective stress, $p'$, such as Bowers, "Pore Pressure Estimation from Velocity Data: Accounting for Pore-Pressure Mechanisms besides Undercompaction," SPE Drilling and Completion (June 1995) 89-95

$$p_e' = \left(\frac{V-V_0}{A_e}\right)^{\frac{1}{B_e}}$$

FIG. 3R

SYSTEM AND METHOD FOR GENERATING AN EARTH MODEL

CROSS-REFERENCE TO RELATED APPLICATIONS

This application claims benefit of U.S. Provisional Application No. 62/739,900, filed Oct. 2, 2018, which is hereby incorporated by reference in its entirety.

STATEMENT REGARDING FEDERALLY SPONSORED RESEARCH OR DEVELOPMENT

Not applicable.

TECHNICAL FIELD

The disclosed embodiments relate generally to techniques for generating earth models of subsurface hydrocarbon reservoirs and, in particular, to a method of generating earth models of subsurface formations based on and consistent between geophysical, geomechanical, and geologic modeling parameters.

BACKGROUND

Geologic Models, Reservoir Flow Models, and Geomechanic Models create very different earth models from the same input datasets, resulting in incoherent conclusions for reservoir management. Inconsistency between the models and the properties they utilize inhibits our ability to compare results and ensure reliability.

Earth models are vital information for defining rock and fluid properties in and around subsurface formations, such as, but not limited to, hydrocarbon reservoirs. The ability to define the location of rock and fluid properties in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for generating holistic earth models that honor all geological, geophysical, and geomechanical data, allowing improved modeling of subsurface formations.

SUMMARY

In yet another aspect of the present invention, to address the aforementioned problems, provide a method. One embodiment of a method of generating a self-consistent earth model comprises: a) building a structured geologic volume of a subsurface formation with geologic time; b) generating a mineralogy volume based on the structured geologic volume; and c) generating a porosity volume and a density volume based on the mineralogy volume. The density volume comprises a fluid density volume of at least one fluid in the subsurface formation and the density is based on the porosity volume. The embodiment of the method further comprises d) generating a pressure volume based on the density volume; and e) generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof. The embodiment of the method further comprises f) generating mechanical elastic properties based on (i) a static to dynamic elastic property relationship and (ii) the geophysical property volume, the relationship between P-wave velocity and S-wave velocity, or any combination thereof; and g) performing mechanical earth modeling using the mechanical elastic properties, the density volume, and the pressure volume to generate a self-consistent earth model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein. One embodiment of a method of generating a self-consistent earth model comprises: a) building a structured geologic volume of a subsurface formation with geologic time; b) generating a mineralogy volume based on the structured geologic volume; and c) generating a porosity volume and a density volume based on the mineralogy volume. The density volume comprises a fluid density volume of at least one fluid in the subsurface formation and the density is based on the porosity volume. The embodiment of the method further comprises d) generating a pressure volume based on the density volume; and e) generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof. The embodiment of the method further comprises f) generating mechanical elastic properties based on (i) a static to dynamic elastic property relationship and (ii) the geophysical property volume, the relationship between P-wave velocity and S-wave velocity, or any combination thereof; and g) performing mechanical earth modeling using the mechanical elastic properties, the density volume, and the pressure volume to generate a self-consistent earth model.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein. One embodiment of a method of generating a self-consistent earth model comprises: a) building a structured geologic volume of a subsurface formation with geologic time; b) generating a mineralogy volume based on the structured geologic volume; and c) generating a porosity volume and a density volume based on the mineralogy volume. The density volume comprises a fluid density volume of at least one fluid in the subsurface formation and the density is based on the porosity volume. The embodiment of the method further comprises d) generating a pressure volume based on the density volume; and e) generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof. The embodiment of the method further comprises f) generating mechanical elastic properties based on (i) a static to dynamic elastic property relationship and (ii) the geophysical property volume, the relationship between P-wave velocity and S-wave velocity, or any combination thereof; and g) performing mechanical earth modeling using the mechanical elastic properties, the density volume, and the pressure volume to generate a self-consistent earth model.

BRIEF DESCRIPTION OF THE DRAWINGS

FIGS. 2A, 2B, and 2C illustrates one embodiment of a method of generating a self-consistent earth model in accordance with some embodiments.

FIG. 3E illustrates one example of generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof.

FIG. 3F illustrates one example of generating the porosity volume and the density volume based on the mineralogy volume, as well as generating the geophysical property volume comprising the P-wave velocity volume and the S-wave velocity volume, the relationship between P-wave velocity and S-wave velocity, or any combination thereof.

FIG. 3I illustrates one example of performing mechanical earth modeling on a regional model and then using the boundary conditions to perform mechanical earth modeling on the smaller, asset scale model.

FIGS. 3O, 3P, 3Q, and 3R are examples related to using a mathematical formulation to iteratively update the pressure volume, the P-wave velocity volume, the S-wave velocity volume, the density volume, or any combination thereof and update the self-consistent earth model.

FIGS. 3S, 3T, 3U, 3V, 3W, and 3X are examples related to using a 4D (four dimensional or time lapse) Mechanical Earth Model to estimate stresses as a function of time or production; and using 4D Mechanical Earth Model results, including stress, strain, and mechanical properties, to iteratively update the geophysical volume, the density volume, the pressure volume, the porosity volume, or any combination thereof.

Like reference numerals refer to corresponding parts throughout the drawings.

DETAILED DESCRIPTION OF EMBODIMENTS

Terminology

Figure 1:
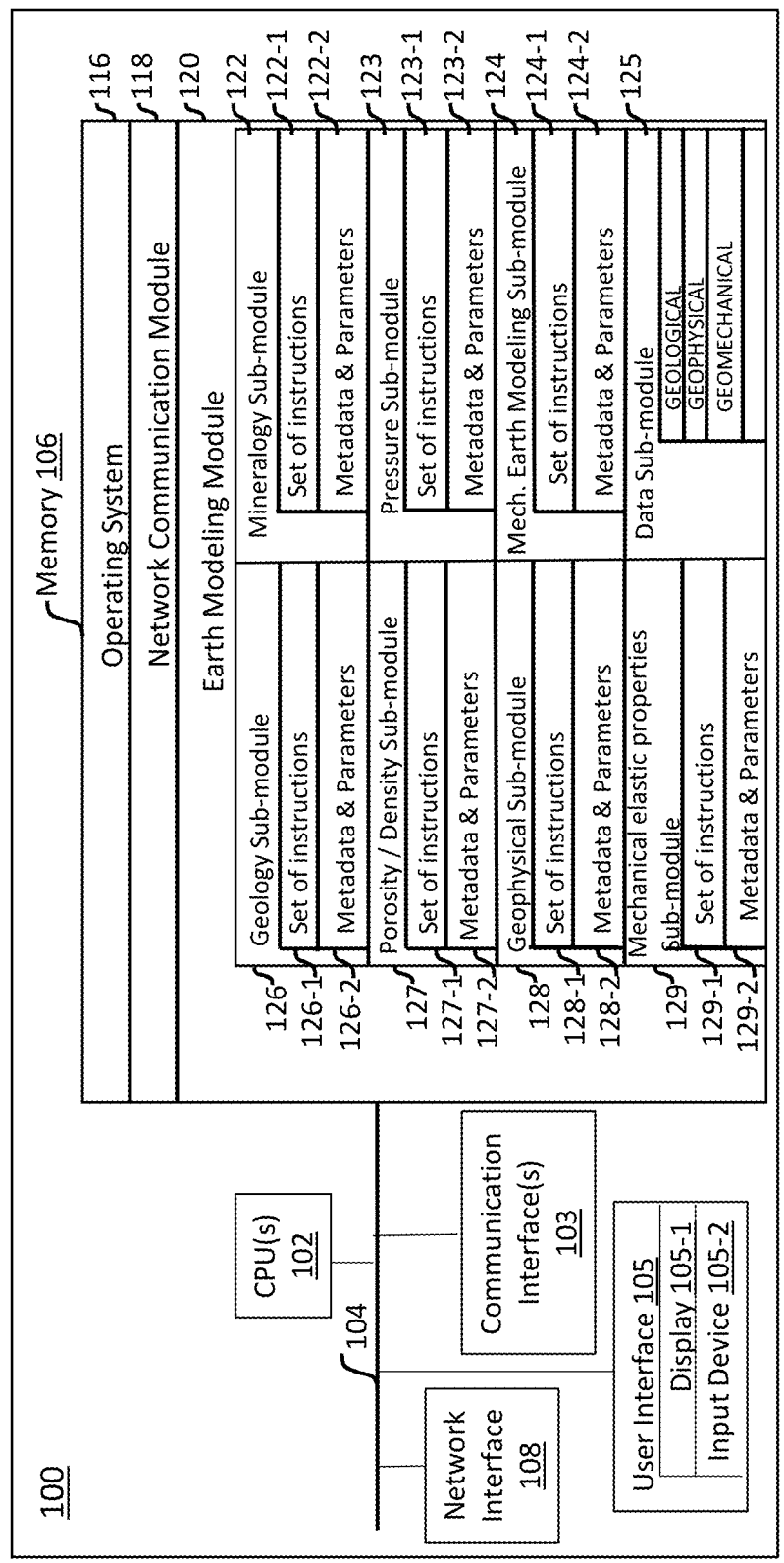
FIG. 1 is a block diagram illustrating an earth modeling system in accordance with some embodiments.

The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons and gas hydrocarbons) (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons are many, and hydrocarbons may include oil, natural gas, kerogen, bitumen, clathrates (also referred to as hydrates), etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a formation having a permeability in the range of from 0.000001 millidarcy to 25 millidarcy (such as an unconventional formation), a formation having a permeability in the range of from 26 millidarcy to 40,000 millidarcy, etc.

The terms "formation", "subsurface formation", "hydrocarbon-bearing formation", "reservoir", "subsurface reservoir", "subsurface region of interest", "subterranean reservoir", "subsurface volume of interest", "subterranean formation", "subsurface", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as production then injection, in some embodiments. The use of the wellbore may also be changed, for example, a particular wellbore may be turned into an injection wellbore after a different previous use as a production wellbore. The wellbore may be drilled amongst existing wellbores, for example, as an infill wellbore. A wellbore may be utilized for injection and a different wellbore may be used for hydrocarbon production, such as in the scenario that hydrocarbons are swept from at least one injection wellbore towards at least one production wellbore and up the at least one production wellbore towards the surface for processing. On the other hand, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards the bedding plane direction. A horizontal section of a wellbore may be, but is not limited to, a horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction.

The wellbore may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation. Enhanced oil recovery may also be referred to as tertiary oil recovery. Secondary recovery is sometimes just referred to as improved oil recovery or enhanced oil recovery. EOR processes include, but are not limited to, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer (AP) flooding, surfactant-polymer (SP) flooding, or alkaline-surfactant-polymer (ASP) flooding), (c) microbial injection, (d) thermal recovery (which includes, for example, cyclic steam and steam flooding), or any combination thereof. The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Another hydrocarbon recovery process(s) may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments. This is not an exhaustive list of hydrocarbon recovery processes.

Other Definitions

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

Described below are methods, systems, and computer readable storage media that provide a manner of self-consistent earth modeling. These embodiments are designed to generate an earth model that is consistent with all geological, geophysical, and geomechanical data.

Some embodiments may be utilized to generate and update rock property models that are consistent between geologic, flow, geomechanic, and seismic earth models. Some embodiments may deliver a geophysical rock property model that is consistent with the geologic model as well as the stresses determined from the geomechanical model. Some embodiments may utilize a mechanical earth model to iteratively update the properties. Some embodiments may be used to create synthetic models or for field data in hydrocarbon reservoirs (e.g., gas and oil reservoirs). Some embodiments may include material property models (e.g., velocities, density, porosity, Vclay) and stress model (e.g., pore pressure and effective mean stress) for reservoirs and non-reservoir material at multiple time steps, as modeled.

Advantageously, holistic earth models that honor all geological, geophysical, and geomechanical data may allow improved modeling of subsurface formations, such as, but not limited to, potential hydrocarbon reservoirs so that the hydrocarbons can be extracted. For example, some embodiments may increase the accuracy of modeling and ensure consistency between models. For example, the self-consistent earth model may provide more accurate delineations of subsurface boundaries.

Advantageously, these embodiments may facilitate cross-functional integration by providing approaches and technologies that enable co-visualization, QC validation, cross-examination, and scenario testing. For example, quantitative utilizations of all surveillance data as constraints, as opposed to qualitative observations, may also increase safety. Integration of multi-disciplinary workflows ensures consistency between different modeling domains and increases reliability of predictive results. Increasing utilization of existing data across functions expands the value of each data/model generated. Ability to visualize all models in single space may also enable improvements and understanding of change(s) needed.

Advantageously, self-consistent earth modeling (e.g., the results from Mechanical Earth Modeling) can be used to optimize well designs, including orientation of wells, drilling mud weight, casing points, and completion designs. For example, having a detailed Mechanical Earth Model that is consistent with the reservoir model and features in the overburden can improve modeling results for the mechanical behavior of the subsurface. Self-consistent earth models may also be used to interpret 4D seismic data, improve imaging of seismic data, understand the potential for fault reactivation and compaction-related changes in the subsurface, optimize productivity of a producing hydrocarbon reservoir, and drive reservoir management decisions.

Advantageously, those of ordinary skill in the art will appreciate that the self-consistent earth model may be utilized in hydrocarbon exploration and hydrocarbon production for decision making. For example, the self-consistent earth model may be utilized to pick a location for a wellbore, such as where to drill one or more wellbores to produce the hydrocarbons, (b) how many wellbores to drill to produce the hydrocarbons, etc. The self-consistent earth model may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Advantageously, those of ordinary skill in the art will appreciate that the self-consistent earth model may be utilized in hydrocarbon exploration and hydrocarbon production for control. For example, the self-consistent earth model may be utilized to steer a tool (e.g., drilling tool) to drill a wellbore. Continuing with the hydrocarbon deposit example, a drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the self-consistent earth model may be utilized for controlling flow of fluids injected into or received from the formation, the wellbore, or any combination thereof. As another example, the self-consistent earth model may be utilized for controlling flow of fluids injected into or received from at least one hydrocarbon producing zone of the formation. Chokes or well control devices that are positioned on the surface, downhole, or any combination thereof may be used to control the flow of fluid into and out. For example, certain subsurface features in the self-consistent earth model may prompt activation, deactivation, modification, or any combination thereof of the chokes or well control devices so as control the flow of fluid. Thus, the self-consistent earth model may be utilized to control injection rates, production rates, or any combination thereof.

Advantageously, those of ordinary skill in the art will appreciate that the self-consistent earth model may be utilized in hydrocarbon exploration and hydrocarbon production to select completions, components, fluids, etc. Continuing with the hydrocarbon deposit example, a variety of casing, tubing, packers, heaters, sand screens, gravel packs, items for fines migration, etc. may be selected for each wellbore to be drilled based on the self-consistent earth model. One or more hydrocarbon recovery processes to produce the hydrocarbon deposit may be selected and/or adjusted based on the self-consistent earth model.

Those of ordinary skill in the art may identify other uses for the self-consistent earth model.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The methods and results provided by various embodiments of the present invention are illustrated in FIGS. 1-3Y.

FIG. 1 is a block diagram illustrating an earth modeling system 100, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the earth modeling system 100 includes one or more processing units (CPUs) 102, one or more network interfaces 108 and/or other communications interfaces 103, memory 106, and one or more communication buses 104 for interconnecting these and various other components. The earth modeling system 100 also includes a user interface 105 (e.g., a display 105-1 and an input device 105-2). The communication buses 104 may include circuitry (sometimes called a chipset) that interconnects and controls communications between system components. Memory 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from the CPUs 102. Memory 106, including the non-volatile and volatile memory devices within memory 106, comprises a non-transitory computer readable storage medium and may store data, earth models, images, and/or geologic structure information.

In some embodiments, memory 106 or the non-transitory computer readable storage medium of memory 106 stores the following programs, modules and data structures, or a subset thereof including an operating system 116, a network communication module 118, and an earth modeling module 120.

The operating system 116 includes procedures for handling various basic system services and for performing hardware dependent tasks.

The network communication module 118 facilitates communication with other devices via the communication network interfaces 108 (wired or wireless) and one or more communication networks, such as the Internet, other wide area networks, local area networks, metropolitan area networks, and so on.

In some embodiments, the earth modeling module 120 executes the operations of the methods shown in the figures. Earth modeling module 120 may include data sub-module 125, which handles the data including geological, geophysical, and geomechanical data. This data is supplied by data sub-module 125 to other sub-modules.

A geology sub-module 126 contains a set of instructions 126-1 and accepts metadata and parameters 126-2 that will enable it to execute operations of the present invention. For example, the sub-module 126 may include building a structured geologic volume of a subsurface formation with geologic time.

A mineralogy (e.g., $V_{clay}$) sub-module 122 contains a set of instructions 122-1 and accepts metadata and parameters 122-2 that will enable it to execute operations of the present invention. For example, the sub-module 122 may include generating a mineralogy volume based on the structured geologic volume.

A porosity/density sub-module 127 contains a set of instructions 127-1 and accepts metadata and parameters 127-2 that will enable it to execute operation of the present invention. For example, the sub-module 127 may include generating a porosity volume and a density volume based on the mineralogy volume. The density volume comprises a fluid density volume of at least one fluid in the subsurface formation and the density is based on the porosity volume.

A pressure sub-module 123 contains a set of instructions 123-1 and accepts metadata and parameters 123-2 that will enable it to perform pressure (e.g., pore pressure) calculations in embodiments. For example, the sub-module 123 may include generating a pressure volume based on the density volume.

A geophysical sub-module 128 contains a set of instructions 128-1 and accepts metadata and parameters 128-2 that will enable it to execute operation of the present invention. For example, the sub-module 128 may include generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof.

A mechanical elastic properties sub-module 129 contains a set of instructions 129-1 and accepts metadata and parameters 129-2 that will enable it to execute operation of the present invention. For example, the sub-module 129 may include generating mechanical elastic properties based on (i) a static to dynamic elastic property relationship and (ii) the geophysical property volume, the relationship between P-wave velocity and S-wave velocity, or any combination thereof.

A mechanical earth modeling sub-module 124 contains a set of instructions 124-1 and accepts metadata and parameters 124-2 that will enable it to execute other operations of the present invention. For example, the sub-module 124 may include performing mechanical earth modeling using the mechanical elastic properties, the density volume, and the pressure volume to generate a self-consistent earth model.

Those of ordinary skill in the art will appreciate that modification can be made to the system 100. In some embodiments, the system 100 may include a separate reservoir model sub-module, for example, to incorporate a reservoir model generated for a hydrocarbon flow simulation model into the structural geologic model. In some embodiments, the system 100 may include a 4D sub-module, for example, to use a 4D Mechanical Earth Model to estimate stresses as a function of time or production; and use 4D Mechanical Earth Model results, including stress, strain, and mechanical properties, to iteratively update the geophysical volume, the density volume, the pressure volume, the porosity volume, or any combination thereof. The separate 4D sub-module may also perform other 4D related operations. Other sub-modules may also be possible.

Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and generating images. For example, any of the sub-modules may optionally be able to generate a display that would be sent to and shown on the user interface display 105-1. In addition, any of the data or processed data products may be transmitted via the communication interface(s) 103 or the network interface 108 and may be stored in memory 106.

Method 200 is, optionally, governed by instructions that are stored in computer memory or a non-transitory computer readable storage medium (e.g., memory 106 in FIG. 1) and are executed by one or more processors (e.g., processors 102) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 200 is described as being performed by a computer system, although in some embodiments, various operations of method 200 are distributed across separate computer systems.

Figure 2B:
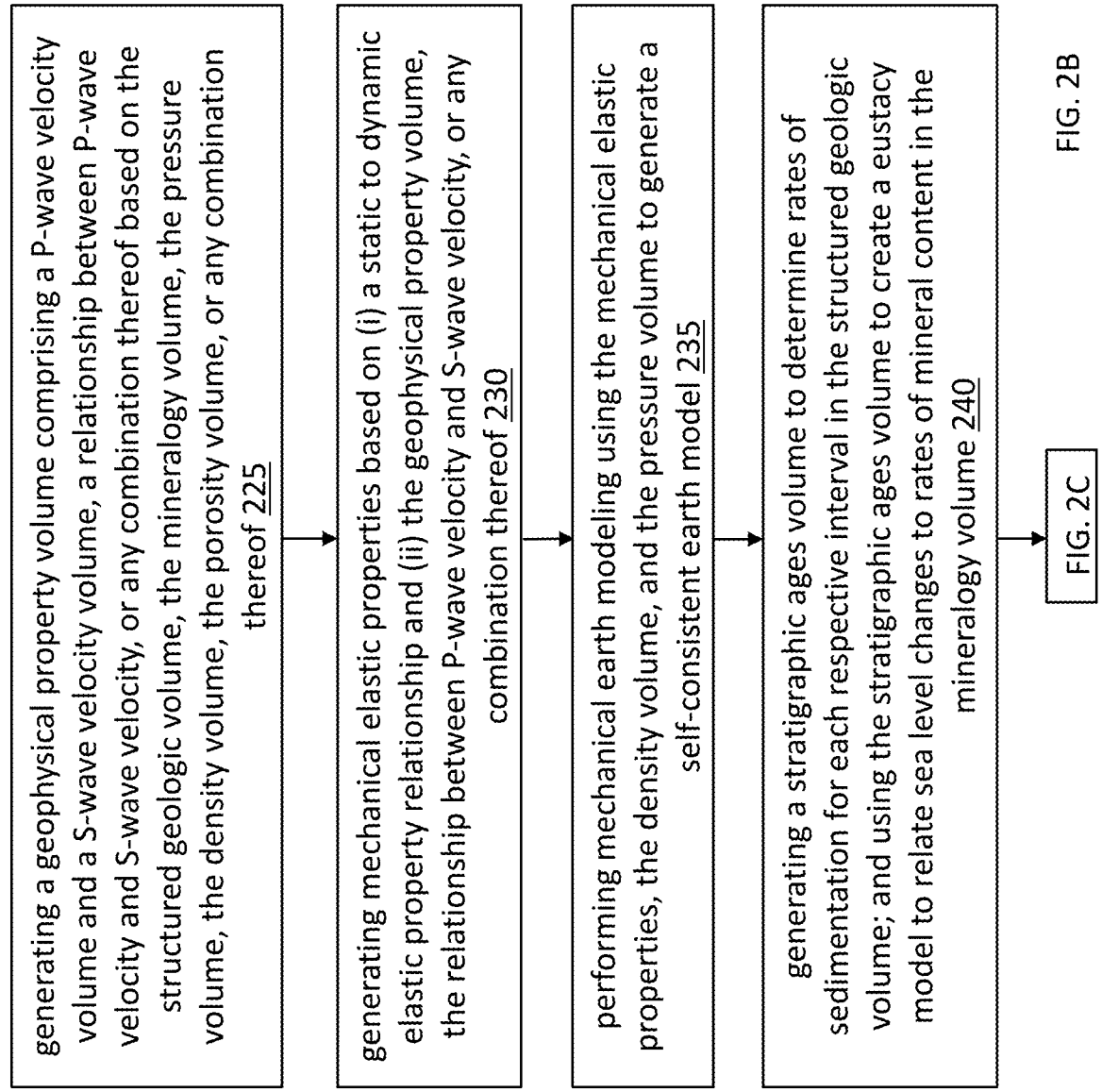
Figure 2C:
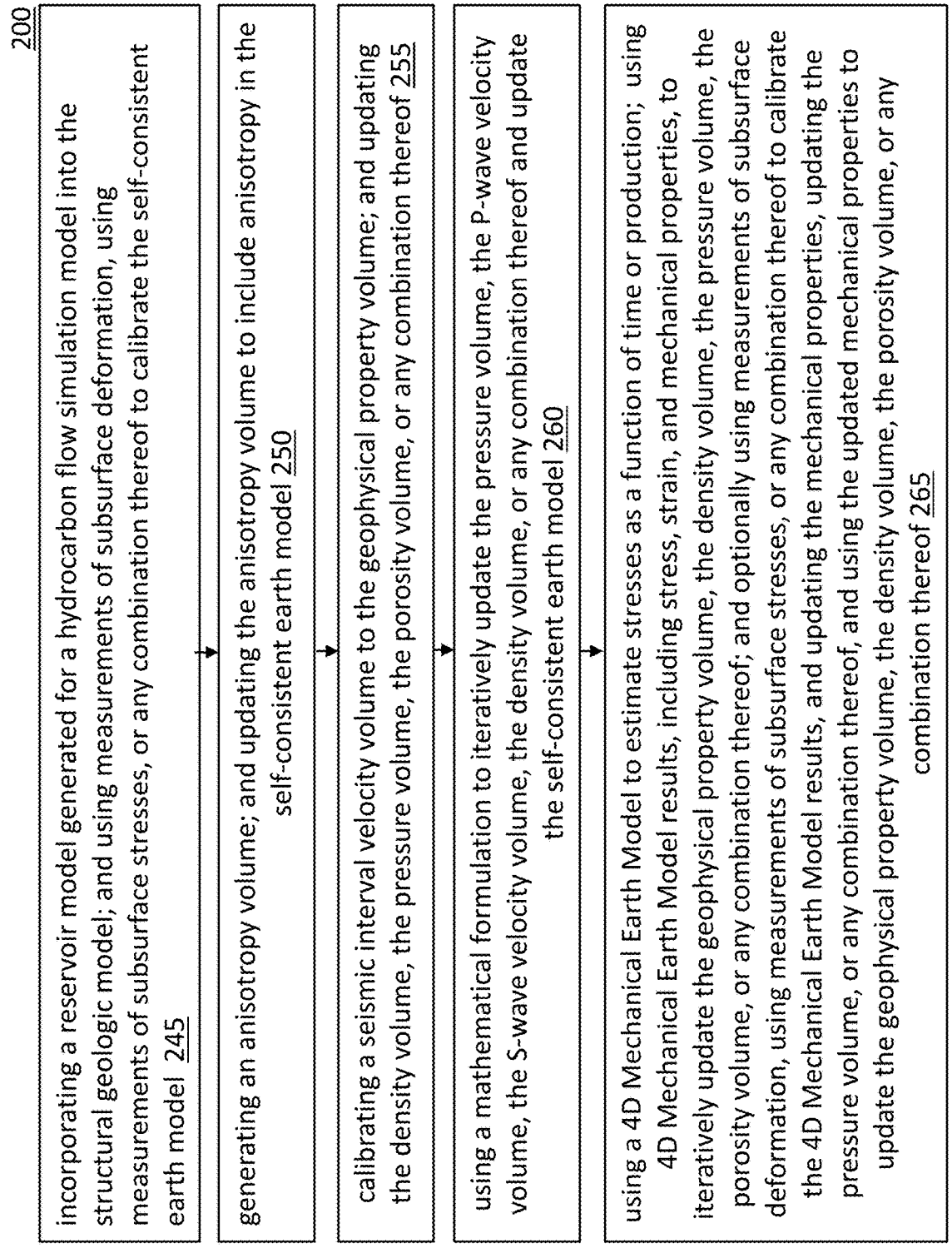

The method 200 of FIGS. 2A, 2B, and 2C illustrates one embodiment of a method of generating a self-consistent earth model. For example, the method 200 is a computer-implemented method. For ease of explanations, one or more figures with examples (e.g., such as synthetic examples) may be referenced during the discussion of the method 200 of FIGS. 2A, 2B, and 2C. Of note, the term "volume" may be utilized for simplicity, but those of ordinary skill in the art will appreciate that "volume" may include "volumes" in some contexts. Moreover, those of ordinary skill in the art will appreciate that some terms may represent thousands, or even, millions of data points, in some contexts. Moreover, the terminology "based on" something may include "responsive to" the something or "using" the something. Moreover, the well data may refer to data from wells drilled in the same subsurface formation and/or data from wells drilled in a different subsurface formation, and well data may depend on availability. Moreover, those of ordinary skill in the art will appreciate that an initial self-consistent earth model may be generated (e.g., using one or more initial volumes), and subsequently, updates may be done iteratively (e.g., updating one or more previously generated volumes as well as updating the previously generated self-consistent earth model) until a final self-consistent earth model is generated. Iteration may be performed until a pre-determined condition is met. Updates/iteration may also be performed when new data becomes available. For simplicity, the term "initial" may be omitted, but a person of ordinary skill in the art will appreciate that the method 200, or portion of the method 200, may be performed multiple times via iteration.

At 205, the method 200 includes building a structured geologic volume of a subsurface formation with geologic time. Some embodiments build layered volume with flat horizons. Some embodiments build structured volume with horizons and faults that correlate to horizons in the flat volume and calculate $\Delta x$, $\Delta y$, $\Delta z$ for each point of the structured volume. Some embodiments use $\Delta x$, $\Delta y$, $\Delta z$ information to translate mineralogy volume (and other volumes) from flat to structured space.

Figure 3A:
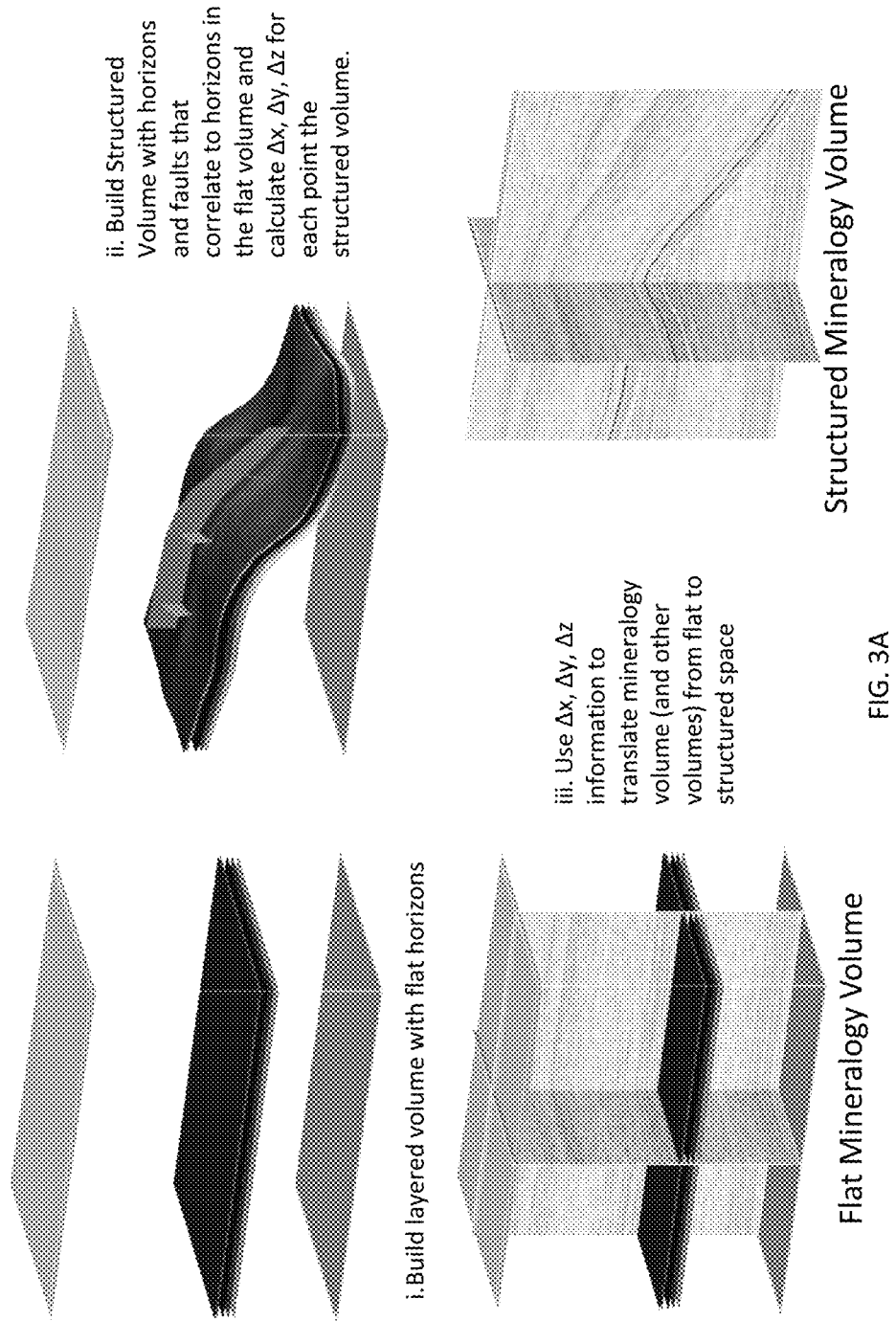
FIG. 3A illustrates one example of building a structured geologic volume of a subsurface formation with geologic time.

More information may be found in the following items: U.S. Pat. Nos. 5,570,106; 5,615,171; 6,765,570; 6,690,820; 5,563,949; 5,629,904; 5,838,564; 5,892,732; 5,930,730; 6,055,482; 6,092,026; 6,430,508; 6,819,628; 6,820,043; 6,859,734; 6,873,913; 7,095,677; 7,123,258; 7,295,929; 7,295,930; 7,328,139; 7,561,922; 7,584,056; 7,711,532; and 7,844,402, each of which is incorporated by reference. More information may be found in US Patent App. Pub. No. 2016/0124116, which is incorporated by reference. FIG. 3A illustrates one example of building a structured geologic volume of a subsurface formation with geologic time.

At 210, the method 200 includes generating a mineralogy volume based on the structured geologic volume. The mineralogy volume includes at least one mineral. The mineralogy volume may include a single mineral in one embodiment, or the mineralogy volume may include a plurality of minerals in a different embodiment. Examples of minerals include, but are not limited to, calcites, anhydrites, etc. For example, the mineralogy volume may be a volume of clay (Vclay), a volume of carbonate (Vcarbonate), etc.

Some embodiments build a chrono-stratigraphic age volume in the flat volume. Some embodiments use age-mineralogy relationships to create a mineralogy volume. Some embodiments translate the mineralogy volume from flat to structured space.

Figure 3B:
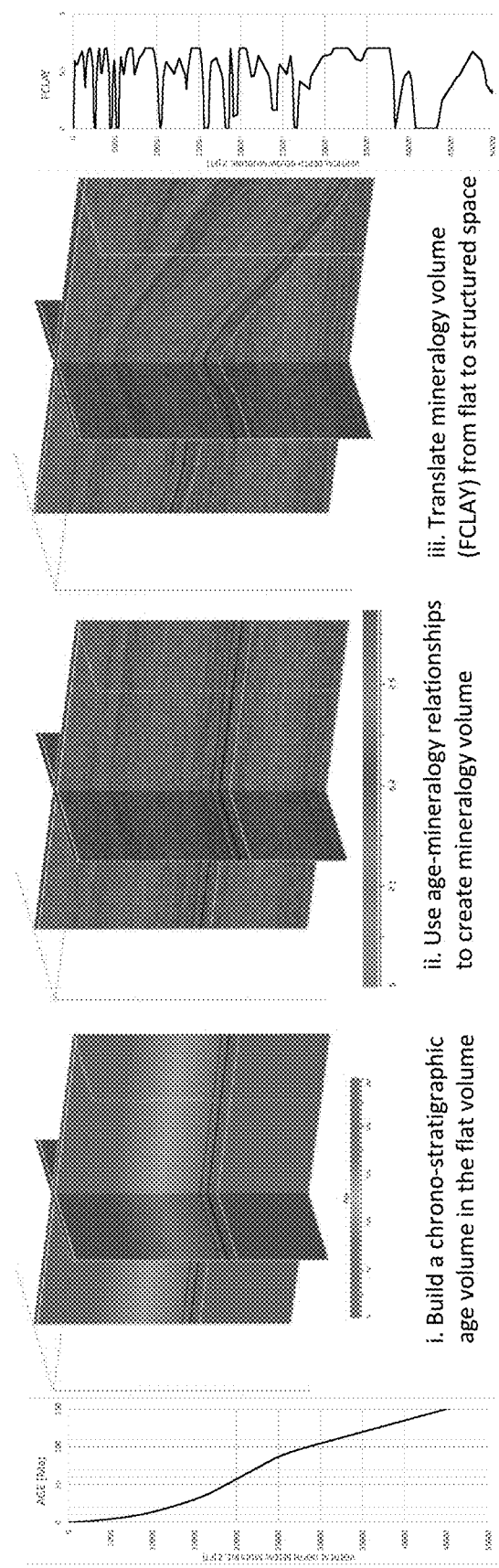
FIG. 3B illustrates one example of generating a mineralogy volume based on the structured geologic volume.

More information, for example, about chrono-stratigraphic methods, may be found in the following items: (1) Mitchum Jr., R. M., 1977, Seismic stratigraphy and global changes of sea level. Part 11: glossary of terms used in seismic stratigraphy. In: Payton, C. E. (Ed.), Seismic Stratigraphy-Applications to Hydrocarbon Exploration, vol. 26. A. A. P. G. Memoir, pp. 205-212; (2) Wheeler, H. E. 1958, Time Stratigraphy. AAPG Bulletin, Vol. 42, p 1047-1063; and (3) Wheeler, H. E. 1964, Baselevel, Lithosphere Surface, and Time-Stratigraphy Geological Society of America Bulletin, July 1964, v. 75, no. 7, p. 599-610, each of which is incorporated by reference. FIG. 3B illustrates one example of generating a mineralogy volume based on the structured geologic volume.

At 215, the method 200 includes generating a porosity volume and a density volume based on the mineralogy volume. The density volume comprises a fluid density volume of at least one fluid in the subsurface formation and the density is based on the porosity volume. The density volume comprises density of at least one fluid in the subsurface formation (e.g., water in the subsurface formation, a non-hydrocarbon fluid in the subsurface formation, etc.).

Some embodiments build a porosity volume based on a mineralogy volume and spatial constraints. For example, the Athy (1930) exponential decline of porosity with depth relationship may be utilized, where $$\Phi_t = (\Phi_0 - \Phi_c)e^{-kz} + \Phi_c, \text{ and}$$

$\Phi_t$=total porosity,
$\Phi_0$=initial porosity at datum (z=0),
$\Phi_c$=porosity at datum (z=0),
z=depth from datum, and
k=compaction coefficient.

In some embodiments, the variables $\Phi_0$, $\Phi_c$, and k are functions calibrated to measured data. More information may be found in Athy, L. F. (1930) Density, Porosity and Compaction of Sedimentary Rocks. Bulletin of the American Association of Petroleum Geologists (AAPG Bulletin), 14, 1-24, which is incorporated by reference.

Some embodiments calculate the density volume from the fluid density, the mineralogy, and the porosity volume.

$$\rho_b = \Phi_t\rho_f + (1-\Phi_t)\rho_m, \text{ and}$$

$\rho_b$=bulk density,
$\rho_f$=fluid density, and
$\rho_m$=matrix density.

Figure 3C:
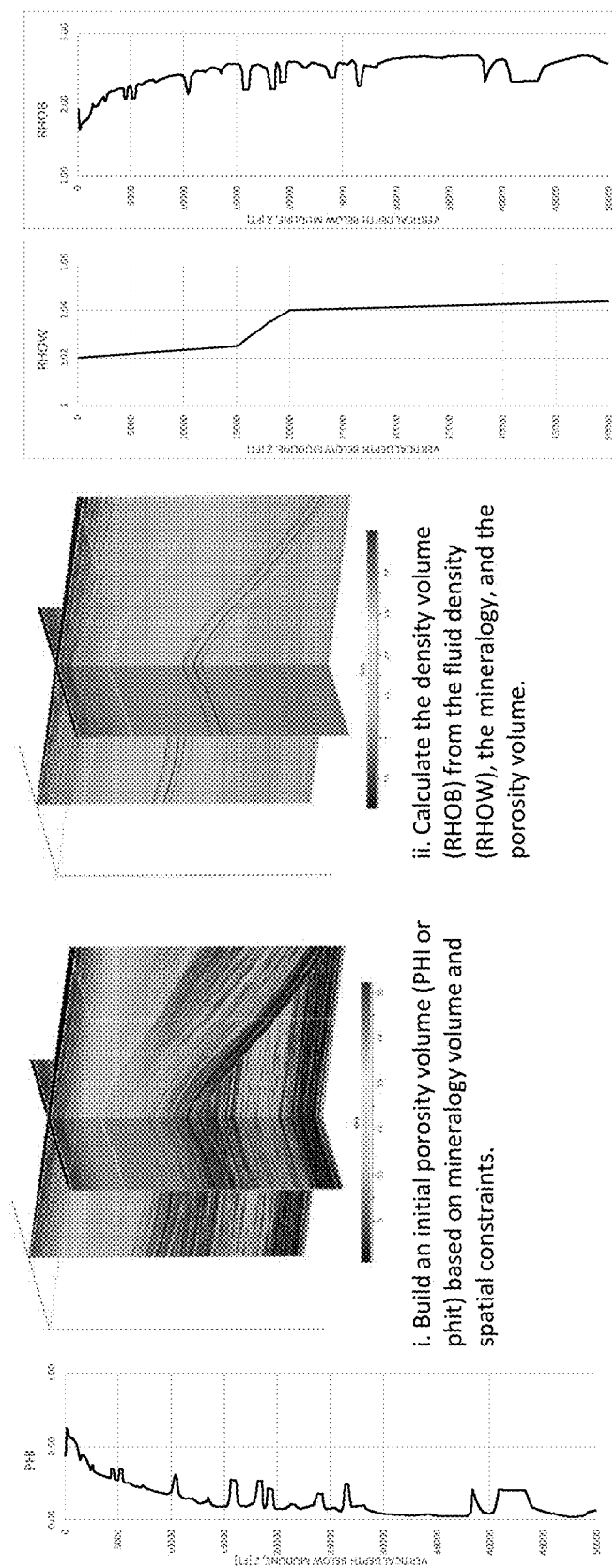
FIG. 3C illustrates one example of generating a porosity volume and a density volume based on the mineralogy volume.

The variable $\rho_f$ is based on known salinity and hydrocarbon content of fluids in the subsurface formation. The variable $\rho_m$ is calculated from the mineralogy volume. FIG. 3C illustrates one example of generating a porosity volume and a density volume based on the mineralogy volume.

At 220, the method 200 includes generating a pressure volume based on the density volume. Some embodiments compute normal hydrostatic pressure from the fluid density, for example, using the following:

$$P_{hyd}(c) = \int_a^c \rho_f(z)g\,dz, \text{such that}$$

$\rho_f(z)$=fluid density at depth z,
a=depth at free water surface
c=depth at which pressure is calculated, and
g=gravity.

Figure 3D:
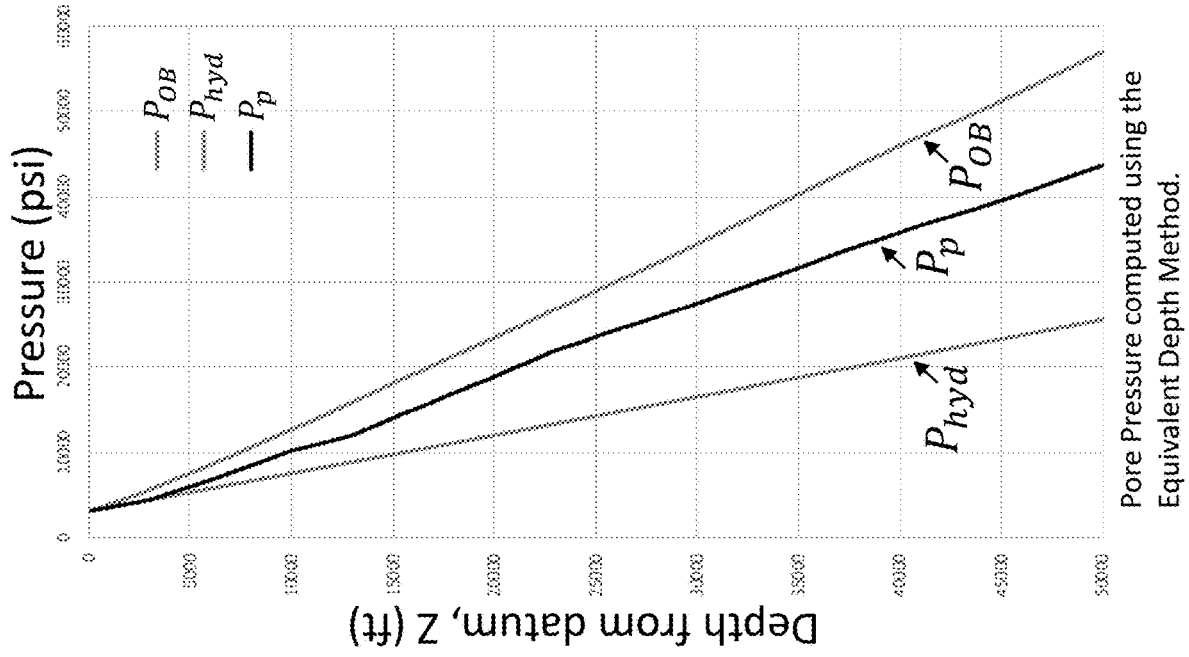
FIG. 3D illustrates one example of generating a pressure volume based on the density volume.

$P_{hyd}$ may be used as the pore pressure or additional detailed pressure volumes may be generated, for example, as explained below (see steps ii-iii in FIG. 3D).

Some embodiments compute overburden pressure volume from the density volume, for example, using the following:

$$P_{OB} = P_{hyd}(b) + \int_b^c \rho_b(z)g\,dz, \text{ where}$$

$P_{hyd}$=hydrostatic pressure,
$\rho_b(z)$=bulk density at depth z,
b=depth at datum (seabed).

Some embodiments compute pore pressure ($P_p$) using a designated method (e.g., Equivalent Depth, Eaton, etc.). Equivalent depth functions are designed to model a range of siliciclastic sediments from mudstones to siltstones and sandstones. A model for shale compaction disequilibrium behavior is employed.

Of note, in some embodiments, the structured geologic volume of the subsurface formation (at 205) comprises an overburden, and the pressure volume is generated based on the density volume and the overburden.

More information may be found in the following items: (1) Foster, J. B. (1966, Feb. 1). Estimation of Formation Pressures From Electrical Surveys-Offshore Louisiana. Society of Petroleum Engineers. J Pet Technol 18 (1966): 165-171; (2) William W Rubey; M King Hubbert (1 Feb. 1959). Role of Fluid Pressure in Mechanics of Overthrust Faulting: II. Overthrust Belt in Geosynclinal Area of Western Wyoming in Light of Fluid-Pressure Hypothesis. GSA Bulletin (1 Feb. 1959) 70 (2):167-206; (3) Ham, H. H., A Method of Estimating Formation Pressures from Gulf Coast Well Logs. AAPG Bulletin (1966) 50 (10): 2322; (4) M King Hubbert; William W Rubey (1 Feb. 1959). Role of Fluid Pressure in Mechanics of Overthrust Faulting: I. Mechanics of Fluid-Filled Porous Solids and its Application to Overthrust Faulting. GSA Bulletin (1 Feb. 1959) 70 (2): 115-166; (5) Mouchet, J. P. and Mitchell, A. 1989. Abnormal Pressures While Drilling: Origins, Prediction, Detection, Evaluation. Paris: Elf EP-Editions, Editions Technip, 255; (6) Terzaghi, K.: Die Berechnung der Durchlässigkeitsziffer des Tones aus dem Verlauf der hydromechanischen Spannungserscheinungen. Sitzungsberichte der Akademie der Wissenschaften in Wien, mathematisch-naturwissenschaftliche Klasse 132, 125-138 (1923); (7) Terzaghi, K.: Theoretical Soil Mechanics, John Wiley & Sons, Inc. New York City (1943) Print ISBN:9780471853053|Online ISBN: 9780470172766; (8) L. F. Athy; Density, Porosity, and Compaction of Sedimentary Rocks. AAPG Bulletin (1930); 14 (1): 1-24; and (9) R. E., Swarbrick, Challenges of porosity-based pore pressure prediction, CSEG Recorder, Sep, p 74, 2002, each of which is incorporated by reference. FIG. 3D illustrates one example of generating a pressure volume based on the density volume.

At 225, the method 200 includes generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof. Some embodiments use a rock physics model, such as the Hunt Raymer Gardner method, to generate P-wave velocity ($V_p$) from density and porosity. Some embodiments use a rock physics model, such as the Gardner or Han methods, to generate S-wave velocity (Vs) from density and porosity.

More information, for example, regarding rock physics models, may be found in the following items: (1) Brocher, T. M. (2005a). Compressional and shear wave velocity versus depth in the San Francisco Bay Area, California: Rules for USGS Bay Area velocity, Model 05.0.0, U. S. Geological Survey Open-File Report 05-1317, 58 pp; (2)

Brocher, T. M. (2005b). Empirical relations between elastic wavespeeds and density in the Earth's crust, Bull. Seism. Soc. Am. 95, 2081-2092; (3) Castagna, J. P., M. L. Batzle, R. L. Eastwood, 1985, Relationships between compressional-wave and shear-wave velocities in clastic silicate rocks: Geophysics, 50, 571-581; (4) Gardner, G, L Gardner & A Gregory, 1974. Formation velocity and density—the diagnostic basis for stratigraphic traps. Geophysics 39, 770-780; (5) Han, D.-H., 1986, Effects of porosity and clay content on acoustic properties of sandstones and unconsolidated sediments: Ph.D. thesis, Stanford University; Robert G. Keys and Shiyu Xu, (2002), "An approximation for the Xu-White velocity model," GEOPHYSICS 67: 1406-1414; (6) Raymer, L. L., Hunt, E. R., and Gardner, J. S., 1980, An improved sonic transit time-to-porosity transform: SPWLA 21 Ann. Logging Symp., Jul. 8-11, 1980, 1-12; Tosaya, C. A., 1982, Acoustical properties of clay-bearing rocks, Ph.D. thesis, Stanford University; (7) Wang, Z., and Nur, A., 1992, Seismic and acoustic velocities in reservoir rocks, Volume 2: SEG Geophysics Reprint Series 10. Wyllie, M. R. J., Gregory, A. R., and Gardner, L. W., 1956, Elastic wave velocities in heterogeneous and porous media: Geophysics, 21, 41-70; (8) Wyllie, M. R. J., Gregory, A. R., and Gardner, G. H. F., 1958, An experimental investigation of factors affecting elastic wave velocities in porous media: Geophysics, 23, 459-493; Xu, S. and Payne, M. A. (2009) Modeling Elastic Properties in Carbonate Rocks. The Leading Edge, 28, 66-74; and (9) Zimmerman, R. W., 1991, Compressibility of sandstones: Elsevier, each of which is incorporated by reference. FIG. 3E illustrates one example of generating a geophysical property volume comprising a P-wave velocity volume and a S-wave velocity volume, a relationship between P-wave velocity and S-wave velocity, or any combination thereof based on the structured geologic volume, the mineralogy volume, the pressure volume, the density volume, the porosity volume, or any combination thereof.

Of note, in some embodiments, generating the porosity volume and the density volume based on the mineralogy volume at 215 and generating the geophysical property volume comprising the P-wave velocity volume and the S-wave velocity volume, the relationship between P-wave velocity and S-wave velocity, or any combination thereof at 225 may be combined. FIG. 3F illustrates one example of this. For simplicity, this example assumes that the mineralogy volume is a Vclay. Eustasy, geostatistical variograms, process stratigraphy reservoirs, and salt model are used to generate Vclay. Density is a function of $V_{clay}$, sediment bulk density, formation water density (varies with depth), grain density, porosity, critical porosity, and initial sediment bulk density are at zero effective stress. Initial water-filled Interval Compressional Velocity is a function of velocity at initial density, using Raymer, Hunt, and Gardner coefficients calibrated to analog Basin well data. Water-filled Interval Shear Velocity is calculated with both $V_{clay}$ and $V_P$, where sands are defined by the Han relationship and shales are calculated with the Castagna mudrock line.

At 230, the method 200 includes generating mechanical elastic properties based on (i) a static to dynamic elastic property relationship and (ii) the geophysical property volume, the relationship between P-wave velocity and S-wave velocity, or any combination thereof. Some embodiments define dynamic (geophysical property volumes) to the static (mechanical property volumes) relationship, for example, with Young's Modulus, density, Poisson's Ratio, etc. (for example, for the water case only; phase dependent geomechanically modeling). Regarding the dynamic to static transform, core to log to seismic function may be determined to move from dynamic (seismic) properties to static (mechanical) properties. The function may be depth, lithology, anisotropy, or geometrically dependent. The mechanical elastic properties may include, but are not limited to, Young's modulus, Poisson's ratio, etc. Of note, in some embodiments, the mechanical elastic properties are generated based on a transform of the geophysical property volume from a dynamic to a static domain.

Figure 3G:
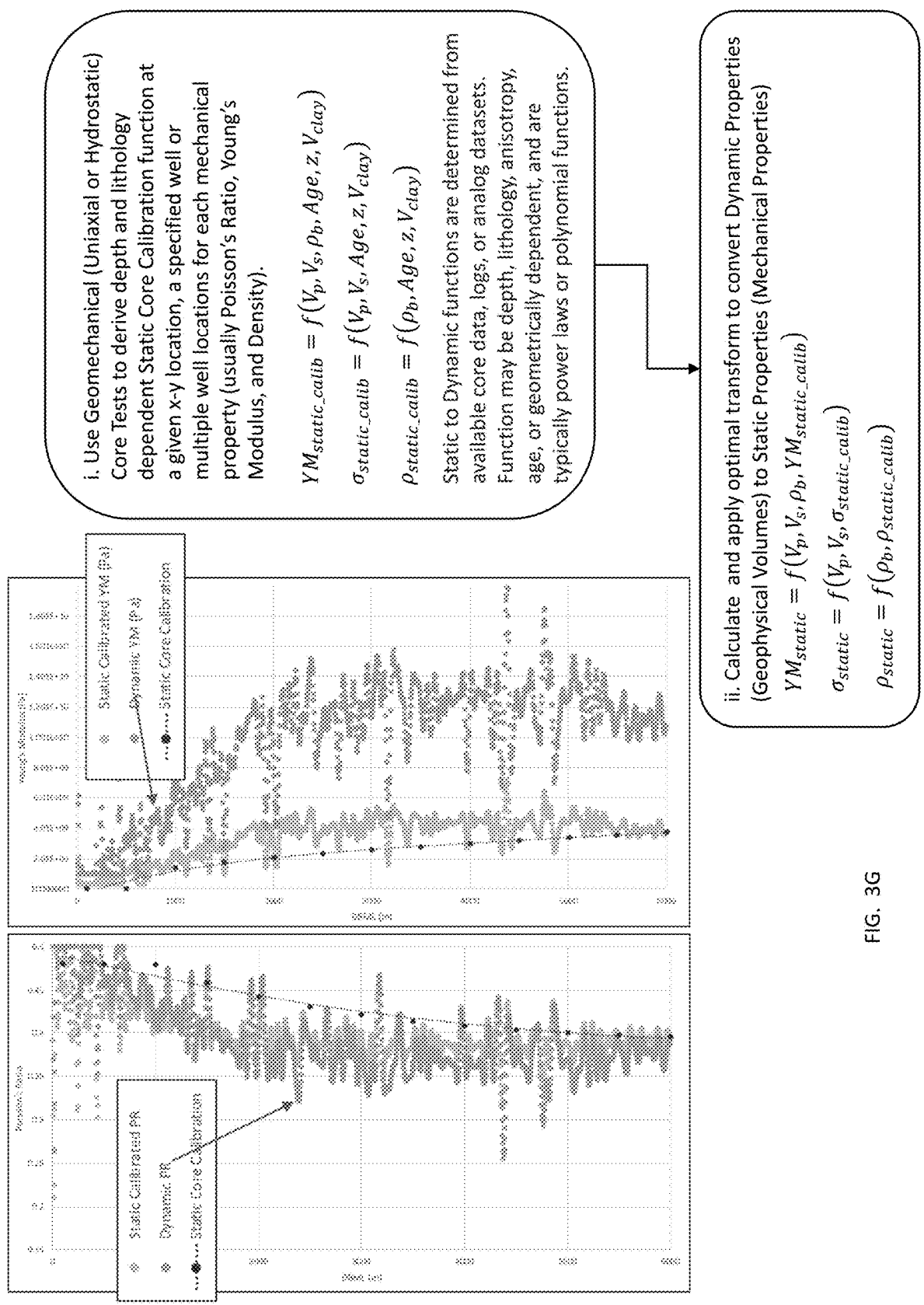
FIG. 3G illustrates one example of generating mechanical elastic properties based on (i) a static to dynamic elastic property relationship and (ii) the geophysical property volume, the relationship between P-wave velocity and S-wave velocity, or any combination thereof.

More information may be found in the following items: (1) Yale, D. P., & Swami, V. (2017, August 28). Conversion of Dynamic Mechanical Property Calculations to Static Values for Geomechanical Modeling. American Rock Mechanics Association; (2) Cheng, C. H. and Johnston, D. H. (1981) "Dynamic and static moduli", in Geophysical Research Letters, vol. 8, pp. 39-42; Erling Fjær, (2009), "Static and dynamic moduli of a weak sandstone," GEOPHYSICS 74: WA103-WA112; and (3) Jaime Melendez-Martinez and Douglas R. Schmitt (2016). "A comparative study of the anisotropic dynamic and static elastic moduli of unconventional reservoir shales: Implication for geomechanical investigations", GEOPHYSICS 81: D245-261, each of which is incorporated by reference. More information, for example, regarding Static-Dynamic References, include the following items: (1) Yale, D. P., & Swami, V. (2017, August 28). Conversion of Dynamic Mechanical Property Calculations to Static Values for Geomechanical Modeling. American Rock Mechanics Association.; (2) Cheng, C. H. and Johnston, D. H. (1981) "Dynamic and static moduli", in Geophysical Research Letters, vol. 8, pp. 39-42; (3) Erling Fjær, (2009), "Static and dynamic moduli of a weak sandstone," GEOPHYSICS 74: WA103-WA112; and (4) Jaime Melendez-Martinez and Douglas R. Schmitt (2016). "A comparative study of the anisotropic dynamic and static elastic moduli of unconventional reservoir shales: Implication for geomechanical investigations", GEOPHYSICS 81: D245-261, each of which is incorporated by reference. FIG. 3G illustrates one example of generating mechanical elastic properties based on (i) a static to dynamic elastic property relationship and (ii) the geophysical property volume, the relationship between P-wave velocity and S-wave velocity, or any combination thereof.

Figure 3H:
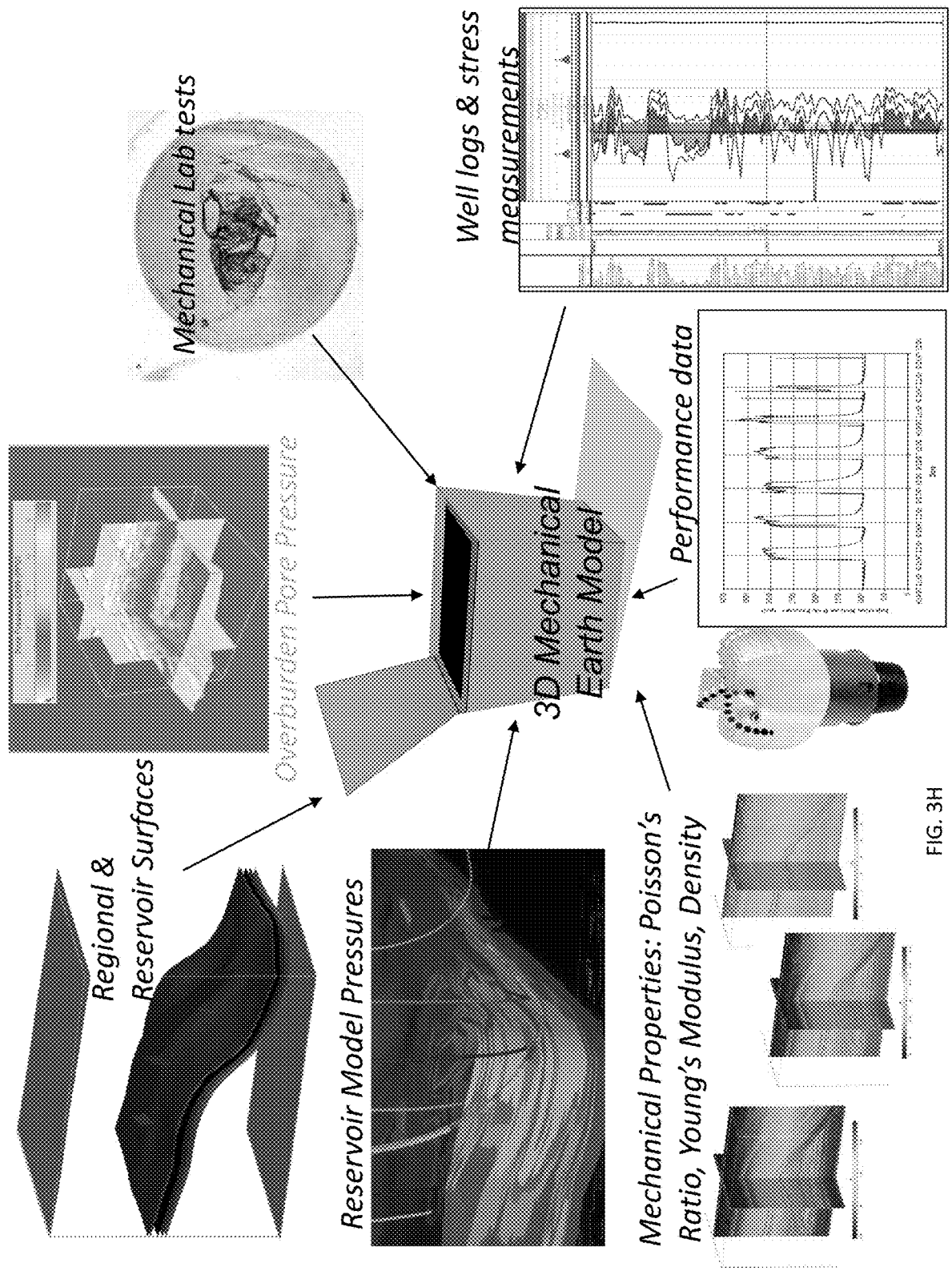
FIG. 3H illustrates one example of performing mechanical earth modeling using the mechanical elastic properties, the density volume, and the pressure volume to generate a self-consistent earth model.
Figure 31:
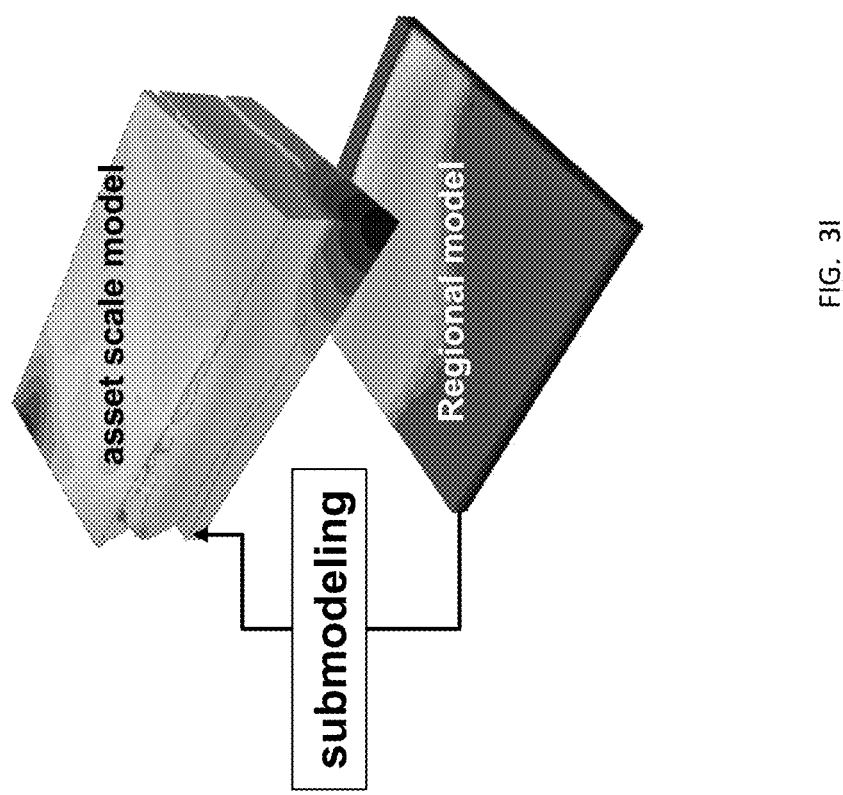

At 235, the method 200 includes performing mechanical earth modeling using the mechanical elastic properties, the density volume, and the pressure volume to generate a self-consistent earth model. FIG. 3H illustrates one example of performing mechanical earth modeling using the mechanical elastic properties, the density volume, and the pressure volume to generate a self-consistent earth model. The self-consistent earth model may be practically any type of earth model. The self-consistent earth model may be a 3D (three dimensional) Mechanical Earth Model (MEM) in some embodiments. In some embodiments, a 3D MEM may be built to include the mechanical properties, the reservoir and overburden pore pressures, and the regional and reservoir surfaces. The MEM creates an estimate of the insitu stress and strain behavior of the subsurface, given tectonic loads applied, the mechanical properties, and the relationship of mechanical properties with stress as defined by the mechanical lab test data. The performance data and the well logs and stress measurements are used to calibrate the MEM. The MEM can be performed at multiple scales: from a basin-wide regional scale to a smaller, asset or field scale model. Boundary conditions from each model can be used to perform a nested modeling approach, where the results of the larger model feed into the smaller model's boundaries.

Some embodiments of mechanical earth modeling include using finite element modeling. Examples of Finite Element Modeling tools include, but are not limited to, Abaqus FEA available via Dassault Systems, Elfen FEA/DEM available via Rockfield Software Ltd., and ParaGeo (Oil & Gas Science and Technology-Rev. IFP Energies nouvelles 73, 18 (2018) © A. J. L. Crook et al., published by IFP Energies nouvelles, 2018, which is incorporated by reference).

Mechanical Earth Modeling is used to simulate the stress, strain, displacements, and mechanical properties for a specified time step and can be run in 3D for an estimate of insitu stress, or in 4D for an estimate of how the subsurface behaves as a function of time or production.

Results from Mechanical Earth Modeling can be used to optimize well designs, including orientation of wells, drilling mud weight, casing points, and completion designs. Having a detailed Mechanical Earth Model that is consistent with the reservoir model and features in the overburden can improve modeling results for the mechanical behavior of the subsurface. Self-consistent Earth Models can also be used to interpret 4D seismic data, improve imaging of seismic data, understand the potential for fault reactivation and compaction-related changes in the subsurface, optimize productivity of a producing hydrocarbon reservoir, and drive reservoir management decisions. FIG. 3I illustrates one example of performing mechanical earth modeling on a regional model and then using the boundary conditions to perform mechanical earth modeling on the smaller, asset scale model.

Those of ordinary skill in the art will appreciate that various modifications may be possible. At 240, the method 200 includes generating a stratigraphic ages volume to determine rates of sedimentation for each respective interval in the structured geologic volume; and using the stratigraphic ages volume to create a eustacy model to relate sea level changes to rates of mineral content in the mineralogy volume. Some embodiments generate the porosity volume (at 215) from the stratigraphic ages volume.

Figure 3J:
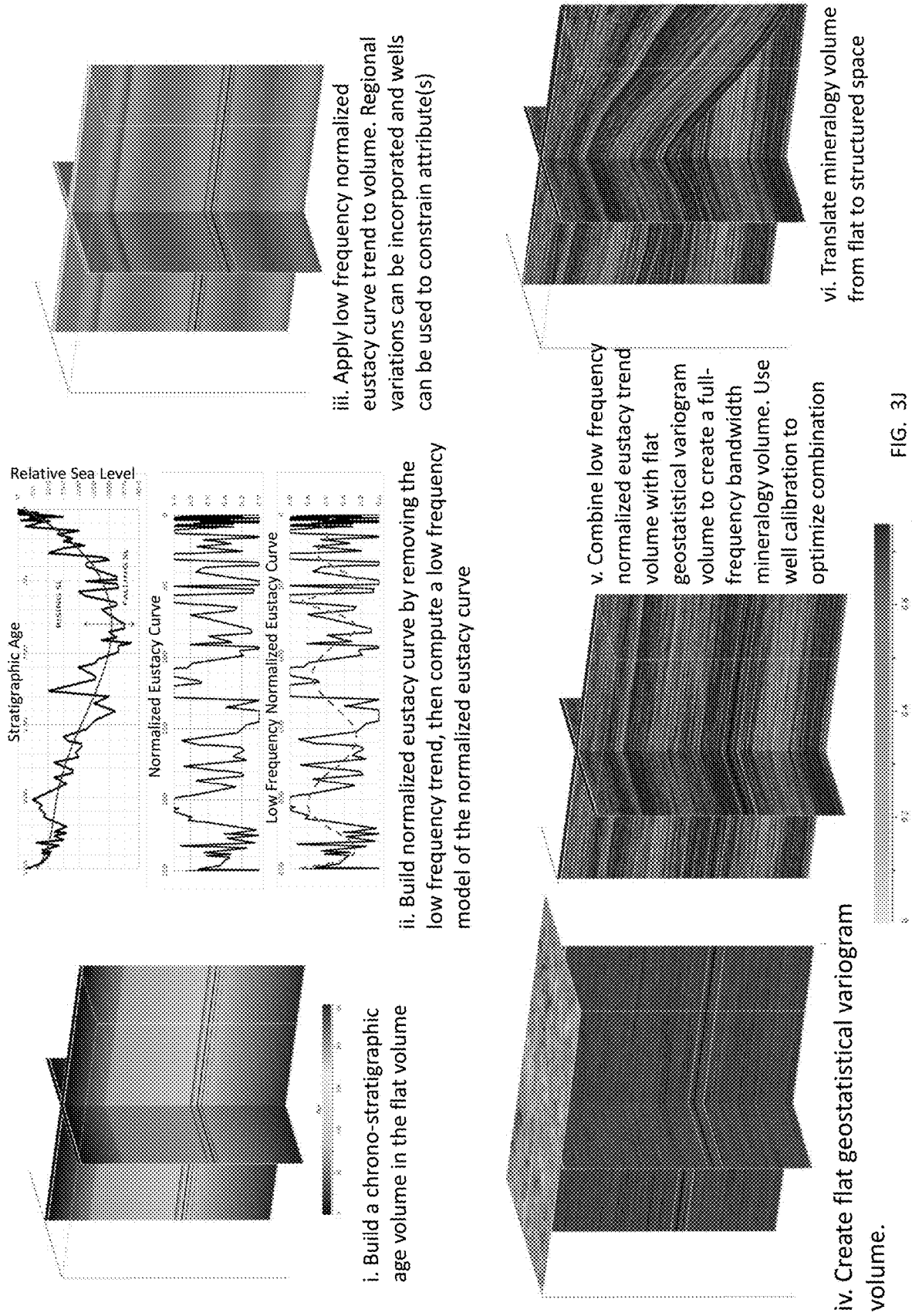
FIG. 3J illustrates one example of generating a stratigraphic ages volume to determine rates of sedimentation for each respective interval in the structured geologic volume; and using the stratigraphic ages volume to create a eustacy model to relate sea level changes to rates of mineral content in the mineralogy volume.

Some embodiments build a chrono-stratigraphic age volume in the flat volume. Some embodiments build a normalized eustacy curve by removing the low frequency trend, then computing a low frequency model of the normalized eustacy curve. Some embodiments apply a low frequency normalized eustacy curve trend to volume. Regional variations can be incorporated and wells can be used to constrain attribute(s). Some embodiments combine a low frequency normalized eustacy trend volume with a flat geostatistical variogram volume to create a full-frequency bandwidth mineralogy volume. Some embodiments use well calibration to optimize the combination. Some embodiments translate the mineralogy volume from flat to structured space. FIG. 3J illustrates one example of generating a stratigraphic ages volume to determine rates of sedimentation for each respective interval in the structured geologic volume; and using the stratigraphic ages volume to create a eustacy model to relate sea level changes to rates of mineral content in the mineralogy volume.

At 245, the method 200 includes incorporating a reservoir model generated for a hydrocarbon flow simulation model into the structural geologic model; and using measurements of subsurface deformation, using measurements of subsurface stresses, or any combination thereof to calibrate the self-consistent earth model. A reservoir flow model detailing the rock properties of a specified region within the subsurface volume can be incorporated into the structural geologic model (at 205) to specify properties for a given region such as a hydrocarbon bearing reservoir. In some embodiments, relationships for different fluids will be required to model the impact on the density and geophysical volumes, for example, using fluid substitution. Furthermore, in some embodiments, calibrating the self-consistent earth model includes (i) updating the mechanical properties, updating the pressure volume, or any combination thereof and/or (ii) using the updated mechanical properties to update the geophysical property volume, the density volume, the porosity volume, or any combination thereof. In some embodiments, calibrating the self-consistent earth model may be an optional step, and it may be performed, for example, if the data is available.

More information, for example, about fluid substitution, may be found in the following items: (1) Gassmann, F., 1951, Uber die Elastizit "at Por" oser Medien: Vier. der Natur. Gesellschaft in Zurich, 96, 1-23; and (2) Brown, R., and Korringa, J., 1975, On the independence of the elastic properties of a porous rock on the compressibility of the pore fluid: Geophyscis, v. 40, 608-616; each of which is incorporated by reference.

Figure 3K:
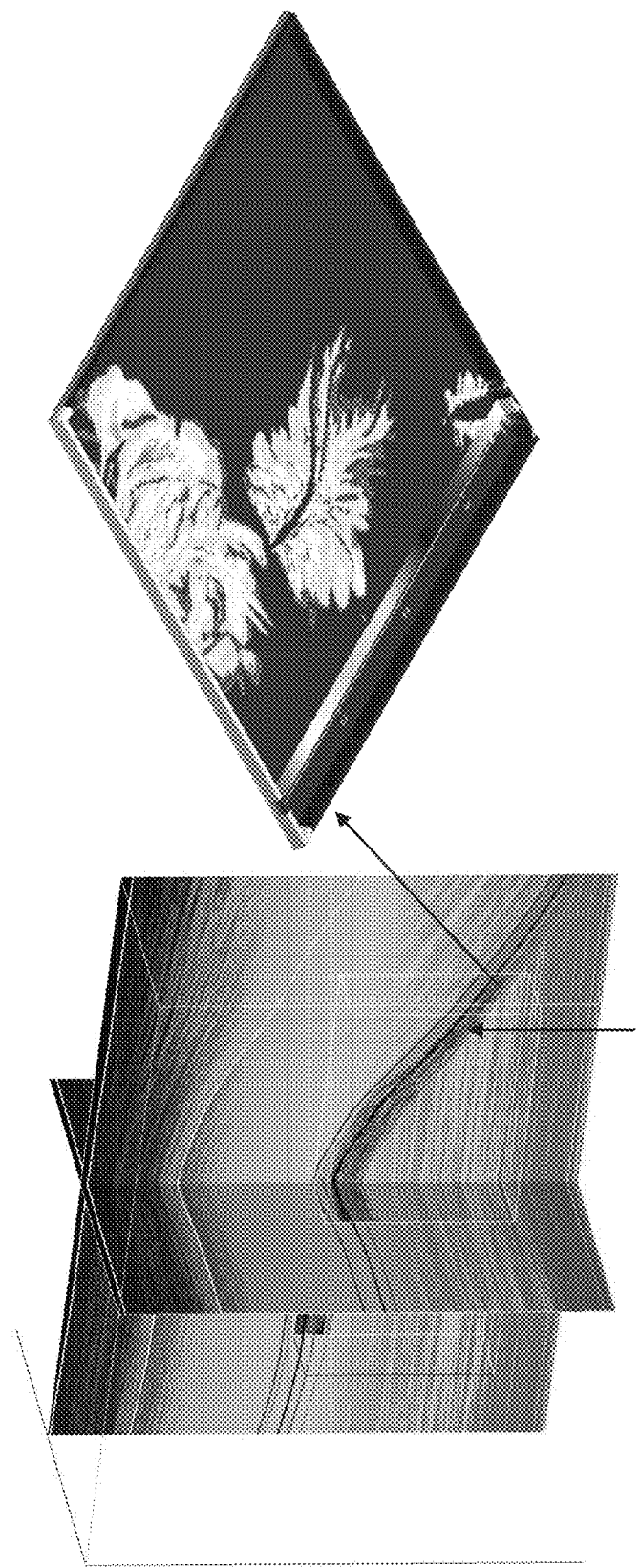
FIG. 3K illustrates one example of incorporating a reservoir model generated for a hydrocarbon flow simulation model into the structural geologic model.
Figure 3L:
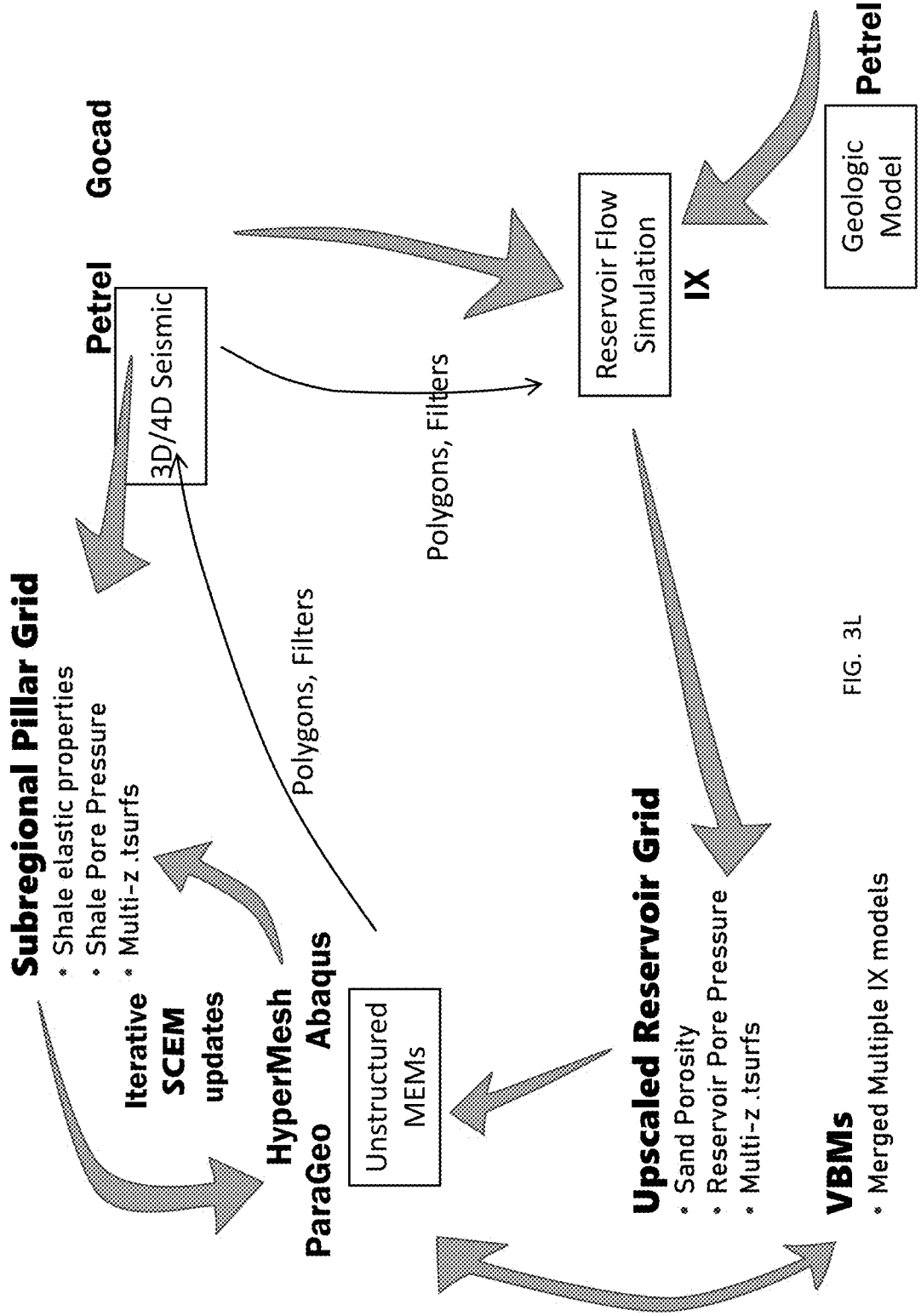
FIG. 3L illustrates another example of incorporating a reservoir model generated for a hydrocarbon flow simulation model into the structural geologic model.

FIG. 3K illustrates one example of incorporating a reservoir model generated for a hydrocarbon flow simulation model into the structural geologic model. FIG. 3L illustrates another example of incorporating a reservoir model generated for a hydrocarbon flow simulation model into the structural geologic model. Both figures incorporate a reservoir flow simulation submodel into the volumes, but FIG. 3L focuses on methods for managing different grids. Regarding FIG. 3L, various issues may be resolved for self-consistent earth modeling, such as, but not limited to, grid consistency (IX/Abaqus/Petrel), upscaling/downscaling, unstructured/structured, efficient transfer of models and model components (surfaces, grids, properties), flexibility with technical issues (e.g. multi-z surfaces), and analysis of differences between models (how to update).

At 250, the method 200 includes generating an anisotropy volume; and updating the anisotropy volume to include anisotropy in the self-consistent earth model. Some embodiments generate an anisotropy volume and redefine (at 225) from just $V_p$, $V_s$ to Thompsen's parameters or Cijkl matrix. Some embodiments update from stress tensor.

Figure 3M:
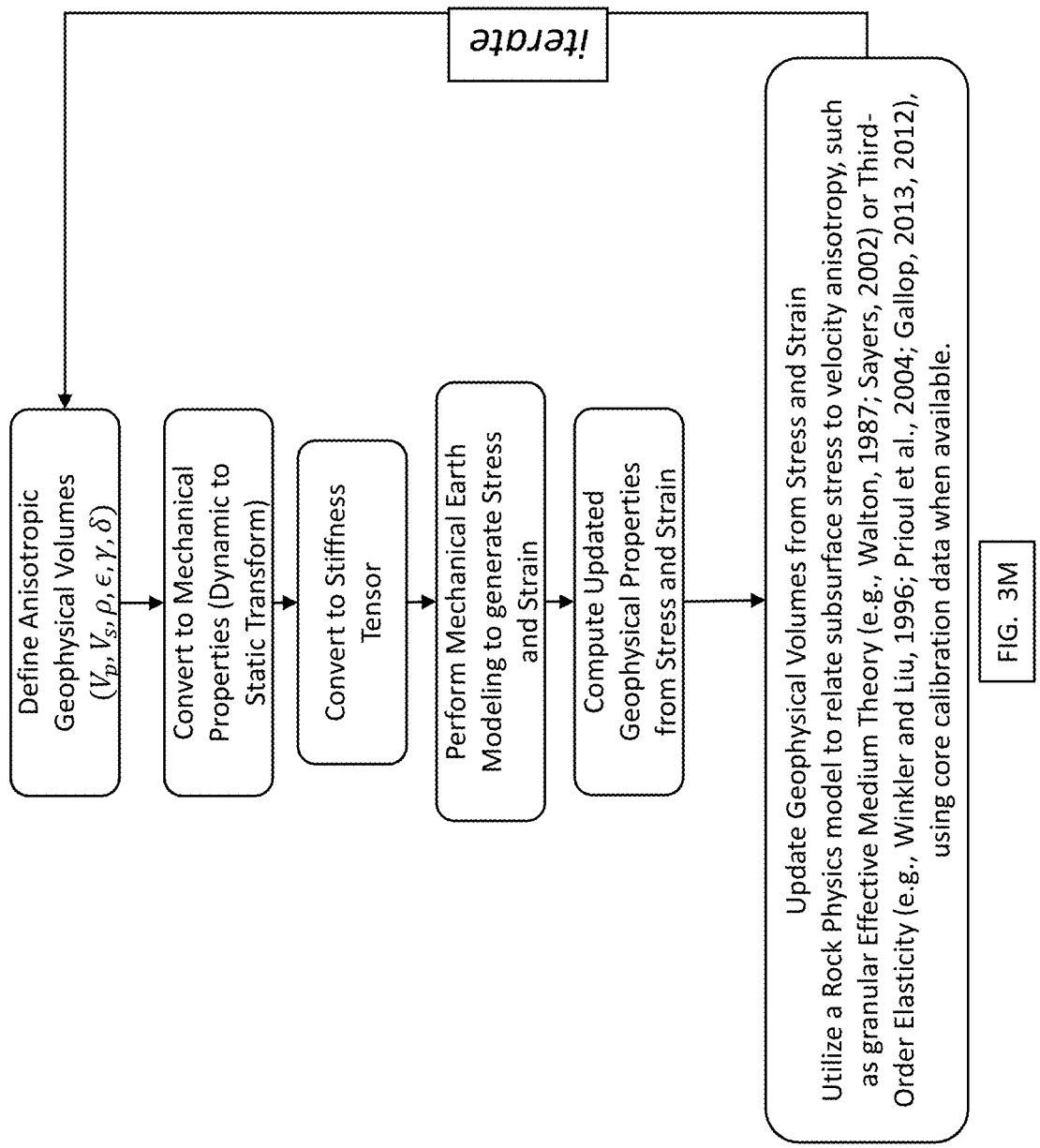
FIG. 3M illustrates one example of generating an anisotropy volume; and updating the anisotropy volume to include anisotropy in the self-consistent earth model.

More information may be found in Thomsen, L. 1986. Weak Elastic Anisotropy. Geophysics 51 (10) 1954-1966, which is incorporated by reference. More information may be found in the following items: (1) Gallop, J., 2012, Perturbing Walton's model for unconsolidated sands with anisotropic stresses: 83rd Annual International Meeting, SEG, Expanded Abstracts, 1-6, Oct. 25, 2012; (2) Gallop, J., 2013, Extended Walton third-order elastic coefficients modified by an anisotropic and stress-dependent coordination number, GEOPHYSICS 78: D545-D556; (3) Sayers, C. M., 2002, Stress-dependent elastic anisotropy of sandstones: Geophysical Prospecting, 50, 85-95; (4) Walton, K., 1987, The effective elastic moduli of a random packing of spheres: Journal of the Mechanics and Physics of Solids, 35, 213-226; (5) Winkler, K. W., and X. Liu, 1996, Measurement of third-order elastic constants in rocks: Journal of the Acoustical Society of America, 100, 1392-1398; and (6) Prioul, R., A. Bakulin, and V. Bakulin, 2004, Nonlinear rock-physics model for estimation of 3D subsurface stress in anisotropic formations: Theory and laboratory verification: Geophysics, 69, 415-425, each of which is incorporated by reference. FIG. 3M illustrates one example of generating an anisotropy volume; and updating the anisotropy volume to include anisotropy in the self-consistent earth model.

At 255, the method 200 includes calibrating a seismic interval velocity volume to the geophysical property volume; and updating the density volume, the pressure volume, the porosity volume, or any combination thereof. Some embodiments include density derivation, such as well calibration using multi-attribute linear regression or seismic inversion for density, utilizing seismic reflectivity, seismic velocity, and density trends from log data. Some embodiments include $V_P$ & $V_S$, such as well calibration using multi-attribute linear regression or seismic inversion for velocities, utilizing seismic reflectivity, seismic velocity, and lithologic trends from log data. Some embodiments include dynamic to static transform, such as core to log to seismic function determined to move from dynamic (seismic) properties to static (mechanical) properties. Function may be depth, lithology, anisotropy, or geometrically dependent.

Figure 3N:
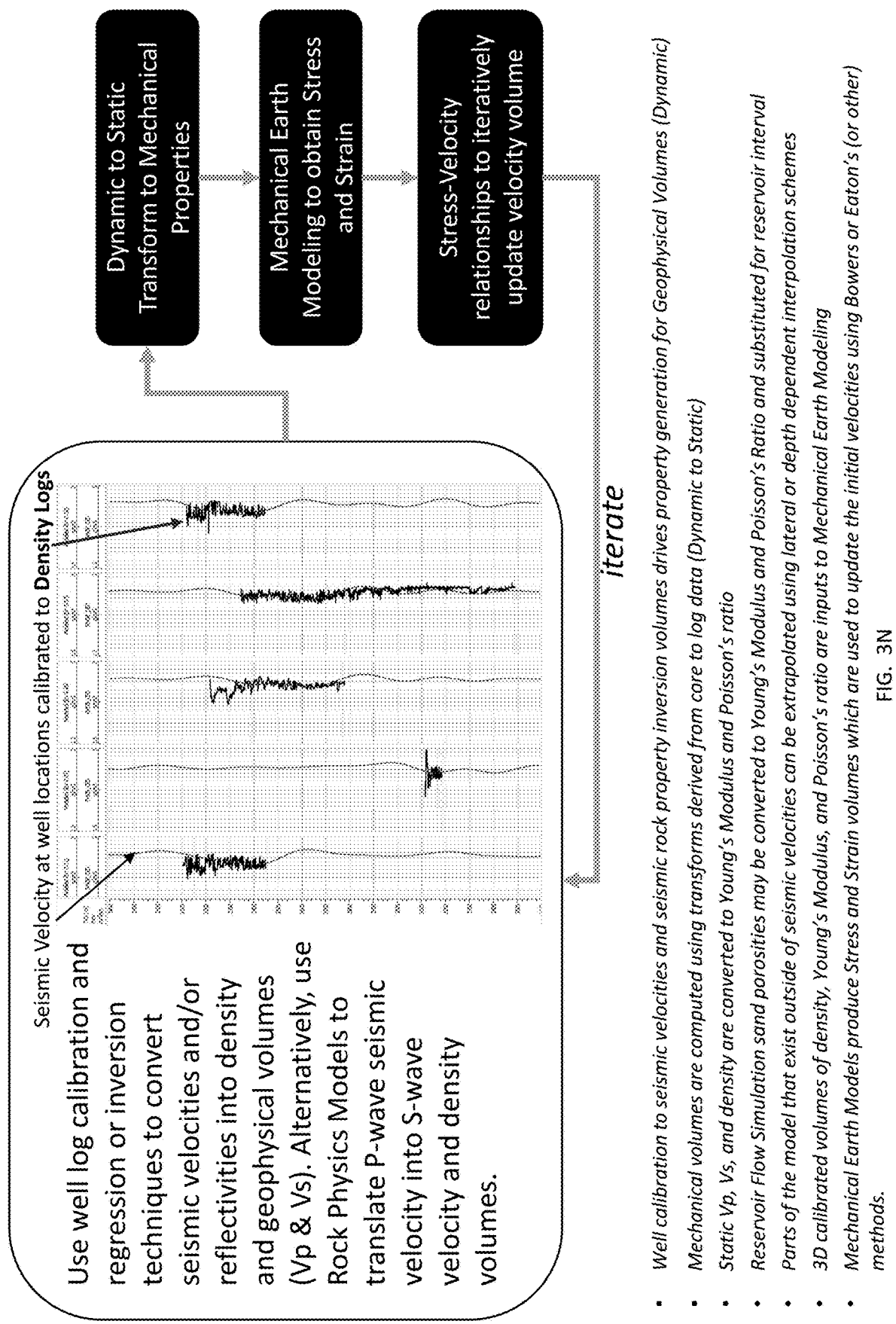
FIG. 3N illustrates one example of calibrating a seismic interval velocity volume to the geophysical property volume; and updating the density volume, the pressure volume, the porosity volume, or any combination thereof.
Figure 30:
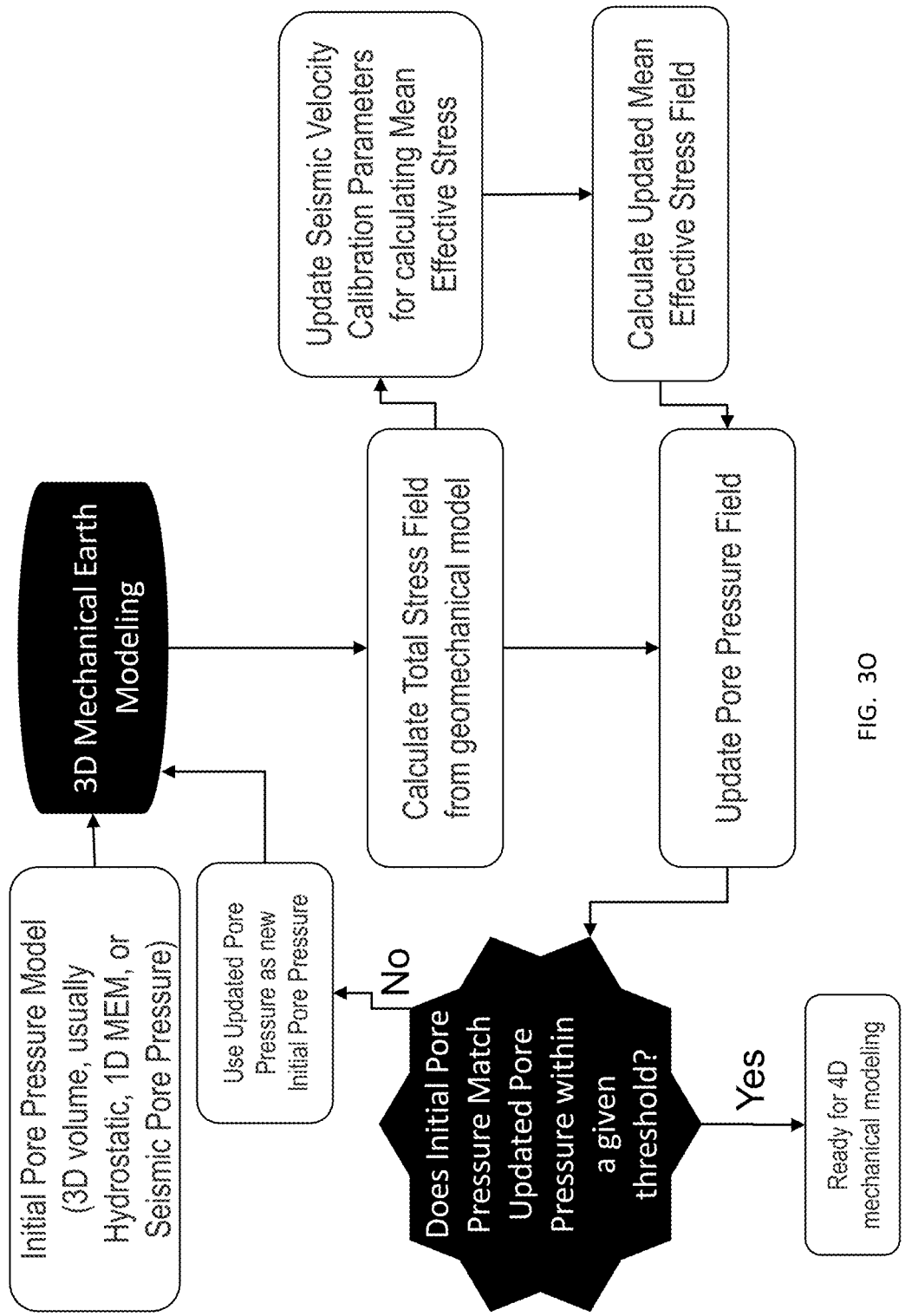

Some embodiments may include the following: (1) well calibration to seismic velocities and quadrature reflectivities drives property generation for seismic rock properties (dynamic), (2) geomechanical rock properties computed using transforms derived from core to log data (static—dynamic), (3) static $V_p$, $V_s$, and density are converted to Young's Modulus and Poisson's ratio, (4) Reservoir Flow Simulation sand porosities may be converted to Young's Modulus and Poisson's Ratio and substituted for reservoir interval; and (5) parts of the model that exist outside of seismic velocities can be extrapolated using lateral or depth dependent interpolation schemes. By doing so, the embodiments may result in 3D calibrated volumes of density, Young's Modulus, and Poisson's ratio for direct input to Mechanical Earth Modeling. FIG. 3N illustrates one example of calibrating a seismic interval velocity volume to the geophysical property volume; and updating the density volume, the pressure volume, the porosity volume, or any combination thereof.

At 260, the method 200 includes using a mathematical formulation (e.g., Eaton or others) to iteratively update the pressure volume, the P-wave velocity volume, the S-wave velocity volume, the density volume, or any combination thereof and update the self-consistent earth model. In some embodiments, iteratively updating the pressure volume includes using a stress volume of the self-consistent earth model or a stress volume of a different earth model instead of the density volume.

Some embodiments may perform an iterative coupling workflow for pore pressure updates, for example, as illustrated in FIG. 3O.

Figure 3P:
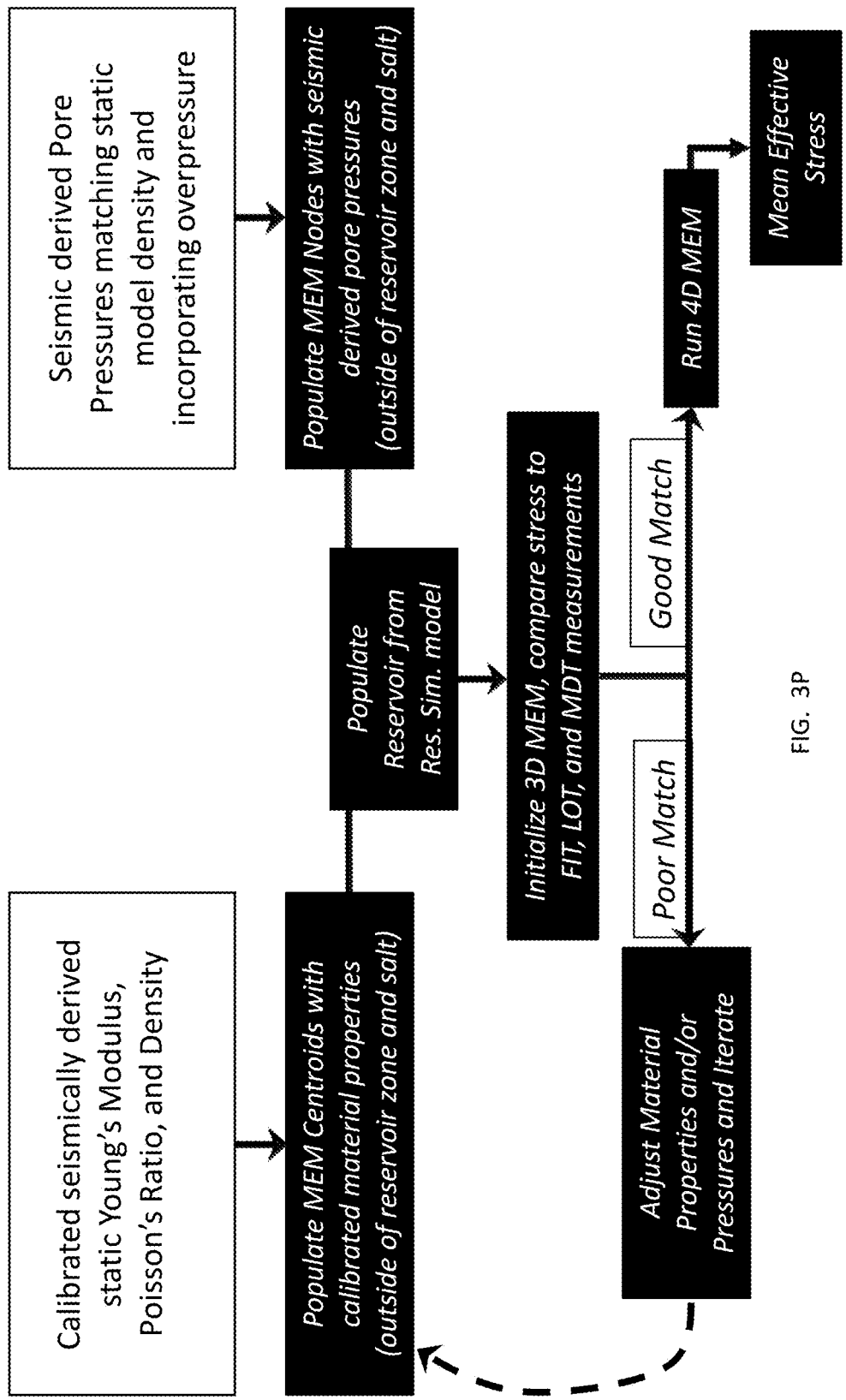

Some embodiments may perform an iterative self-consistent pore pressure workflow using seismic derived pore pressure, for example, as illustrated in FIG. 3P. For example, an improve shale overburden model may be generated by utilizing seismic velocities and reflectivities, as in the following: (1) well data trends are used to derive seismic-based overburden properties and pore pressures, (2) pore pressures are derived from same data used for material properties generation, helping to avoid inconsistencies, (3) initial 3D MEM is calibrated to all available stress information, and (4) validation of 3D MEM.

Figure 3Q:
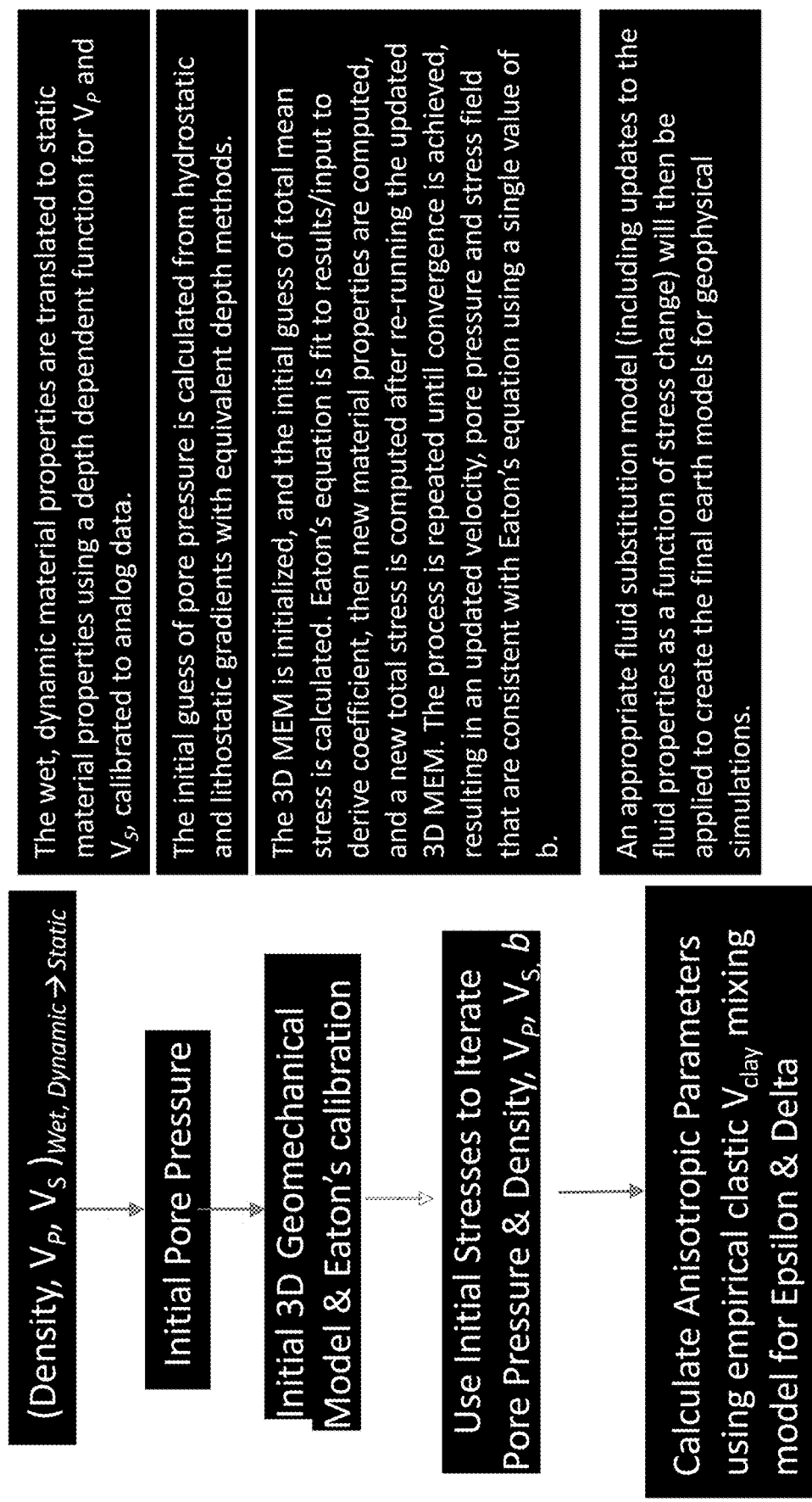
Figure 35:
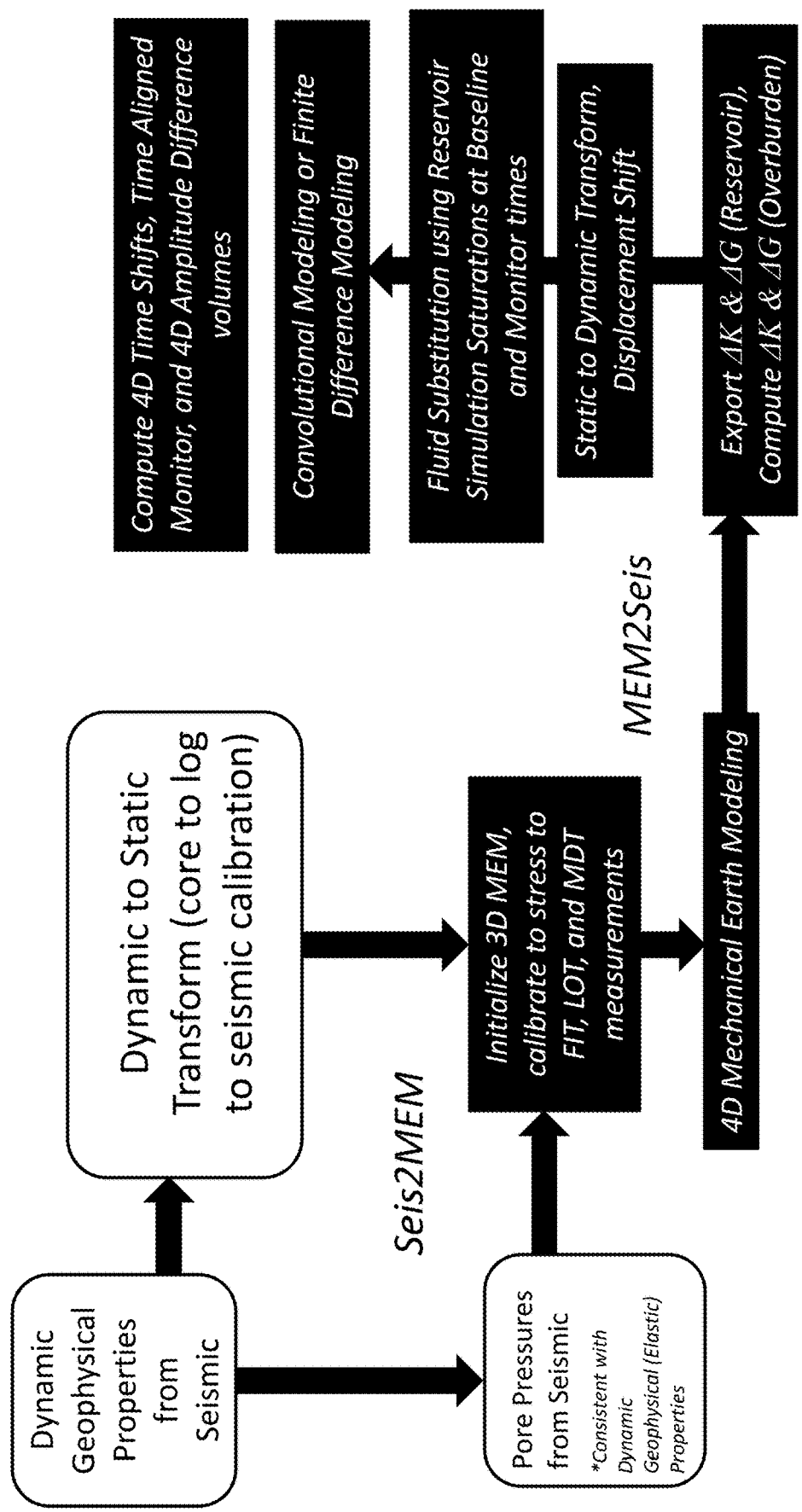

Some embodiments may perform an iterative self-consistent earth modeling workflow with anisotropy, for example, as illustrated in FIG. 3Q. Eaton, "*The Equation for Geopressure Prediction from Well Logs*," SPE 5544 (Society of Petroleum Engineers of AIME, 1975), which is incorporated by reference, may be utilized as indicated in FIG. 3Q.

Some embodiments may perform iterative pore pressure updates using full stress tensor, for example, as illustrated in FIG. 3R. Bowers, "*Pore Pressure Estimation from Velocity Data: Accounting for Pore-Pressure Mechanisms besides Undercompaction*," SPE Drilling and Completion (June 1995) 89-95, which is incorporated by reference, may be utilized as indicated in FIG. 3R.

At 265, the method 200 includes using a 4D Mechanical Earth Model to estimate stresses as a function of time or production; using 4D Mechanical Earth Model results, including stress, strain, and mechanical properties, to iteratively update the geophysical property volume, the density volume, the pressure volume, the porosity volume, or any combination thereof; and optionally using measurements of subsurface deformation, using measurements of subsurface stresses, or any combination thereof to calibrate the 4D Mechanical Earth Model results, and updating the mechanical properties, updating the pressure volume, or any combination thereof, and using the updated mechanical properties to update the geophysical property volume, the density volume, the porosity volume, or any combination thereof. The term "optionally" is meant to indicate that the mechanical properties may be updated in some embodiments (e.g., if the data is available), but the mechanical properties may not be updated in some embodiments (e.g., if the data is not available). Some embodiments include using the 4D Mechanical Earth Modeling results, including the stress, strain, and mechanical properties (updated mechanical properties or not updated mechanical properties), at specified time steps to model 4D seismic time lapse response due to production. Some embodiments include using the 4D Mechanical Earth Modeling results, including the stress, strain, and mechanical properties (updated mechanical properties or not updated mechanical properties), at specified time steps to improve a velocity model (e.g., seismic interval velocity volume or P-wave velocity volume or S-wave velocity volume) for 3D seismic imaging.

Some embodiments may perform a self-consistent earth modeling workflow for 4D seismic time lapse modeling, for example, as illustrated in FIG. 3S.

Figure 3T:
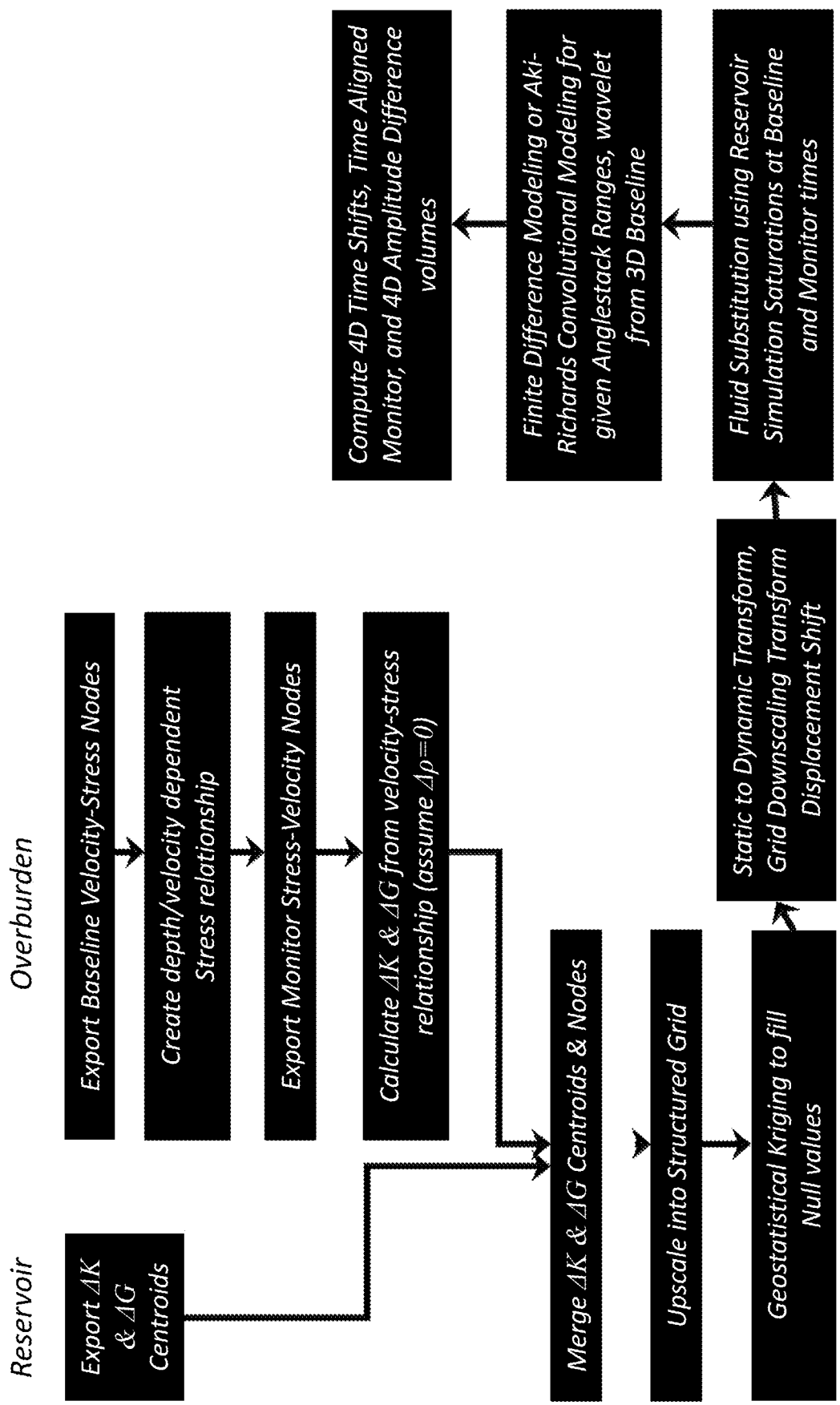

Some embodiments may perform a self-consistent earth modeling workflow for 4D seismic time lapse modeling, for example, as illustrated in FIG. 3T. For example, geomechanical changes to the Bulk and Shear Modulus may be computed by a Finite Element Modeler in the reservoir (nonlinear, porous elastic model). For example, changes in overburden can be imposed via a velocity-stress relationship calibrated from core data, or a R-factor relationship can be used where strain changes in the mechanical earth model control the amount of elastic (modulus or velocity) changes.

Figure 3U:
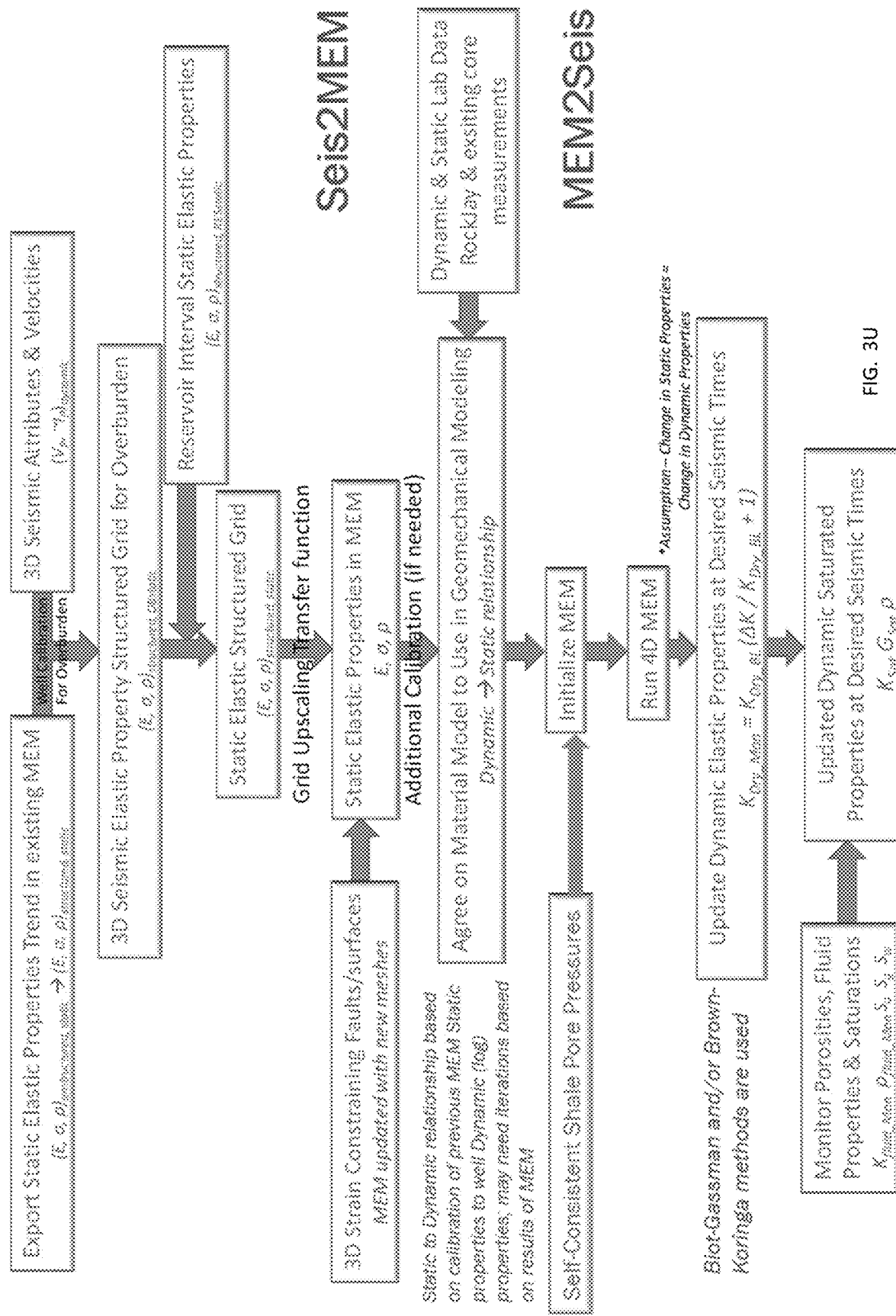

Some embodiments may perform a geomechanical 4D seismic workflow, for example, as illustrated in FIG. 3U.

Figure 3V:
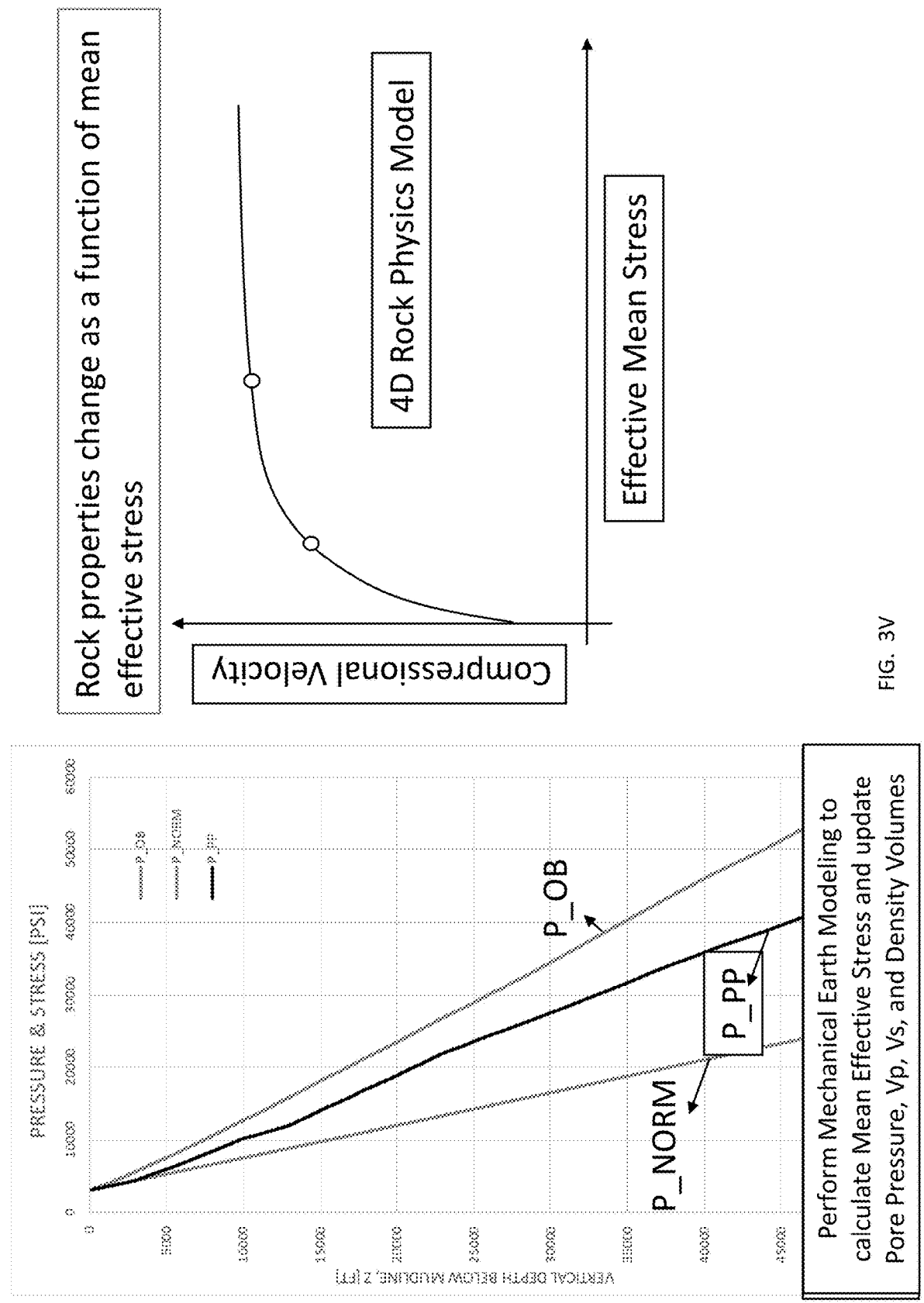

Some embodiments may generate self-consistent earth models for 4D seismic time lapse modeling: deriving 4D rock physics model for sands and shales, for example, as illustrated in FIG. 3V. For example, an empirical 4D rock physics model for sands and shales is fit to the updated wet, dynamic properties pre-production, and the post-production changes in $V_P$ and $V_S$ are calculated based on the monitor-time porosity and Effective Mean stress, computed from the mechanical model. For example, if an inelastic material model is utilized in the MEM, the changes in bulk and shear moduli will be automatically calculated, and simply need to be converted to dynamic properties. For example, the earth model is updated based on the effective-mean stress and velocity relationships for sands and shales, as determined from laboratory testing. A calculation to Bulk Modulus (K) and Shear Modulus (G) will be required to compute the 4D seismic time lapse model.

Figure 3W:
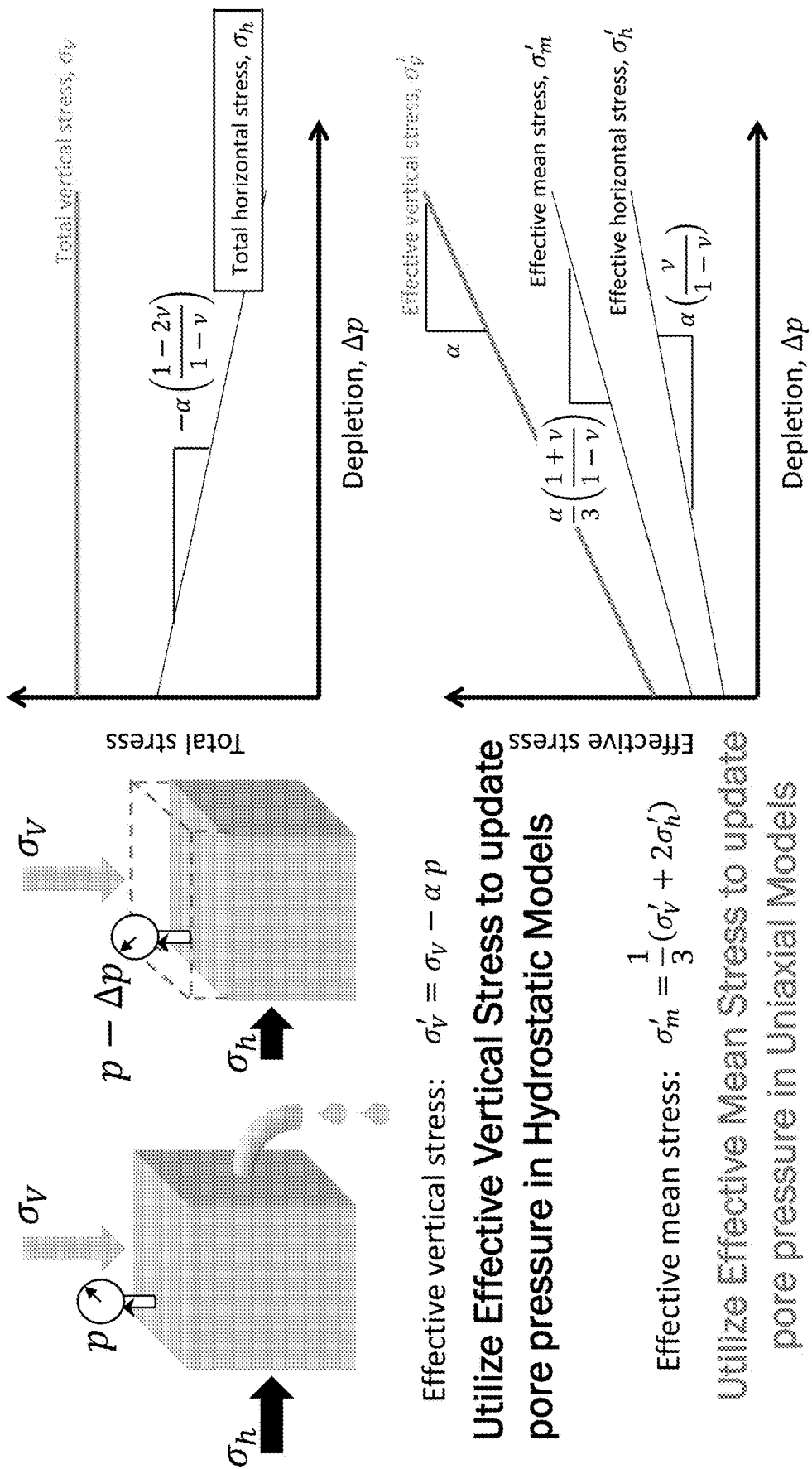

Some embodiments may generate self-consistent earth models for 4D seismic time lapse modeling: comparing effective vertical stress vs. effective mean stress, for example, as illustrated in FIG. 3W.

Figure 3X:
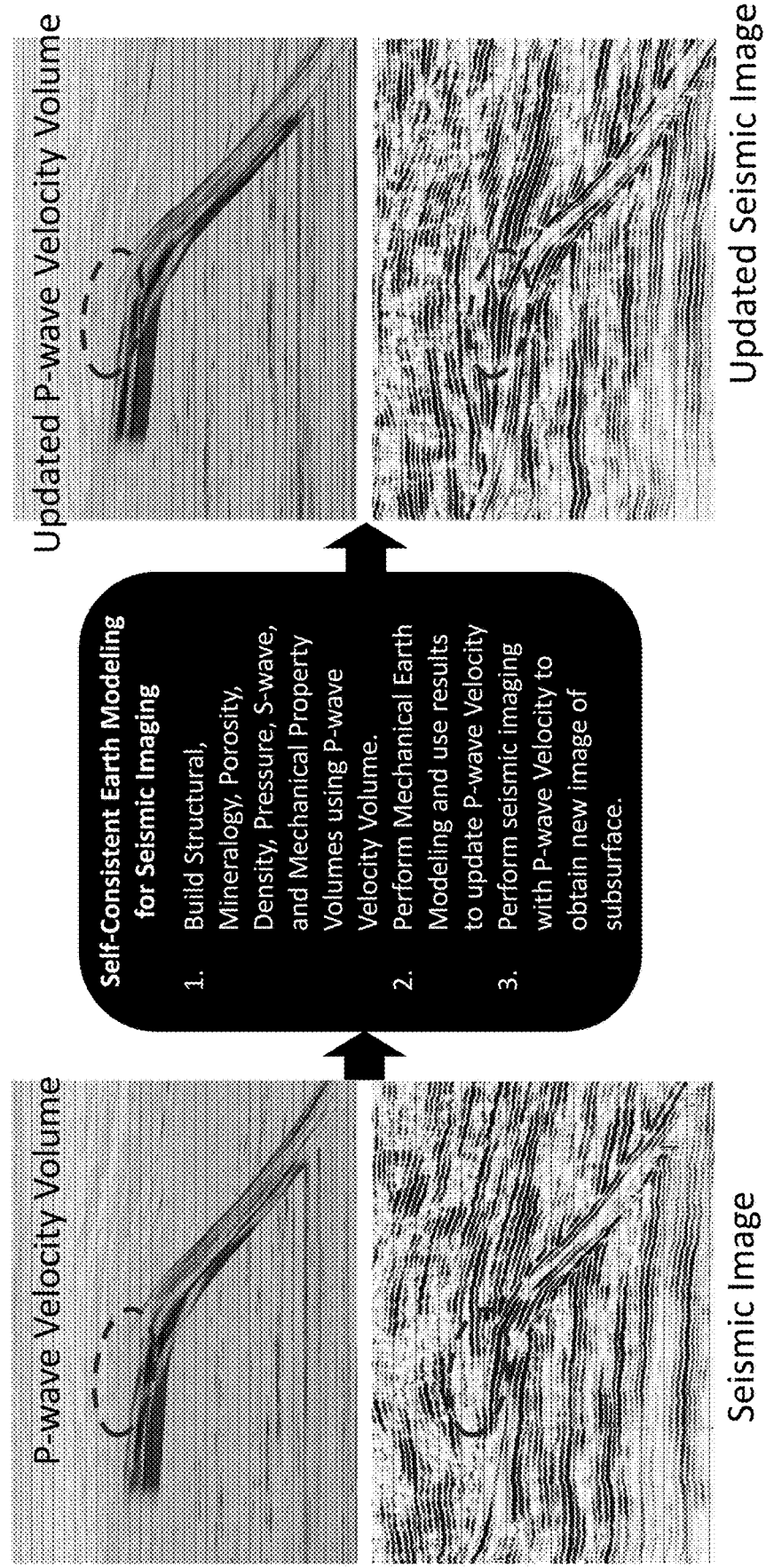

Some embodiments may update a velocity model for seismic imaging, for example, as illustrated in FIG. 3X.

Figure 3Y:
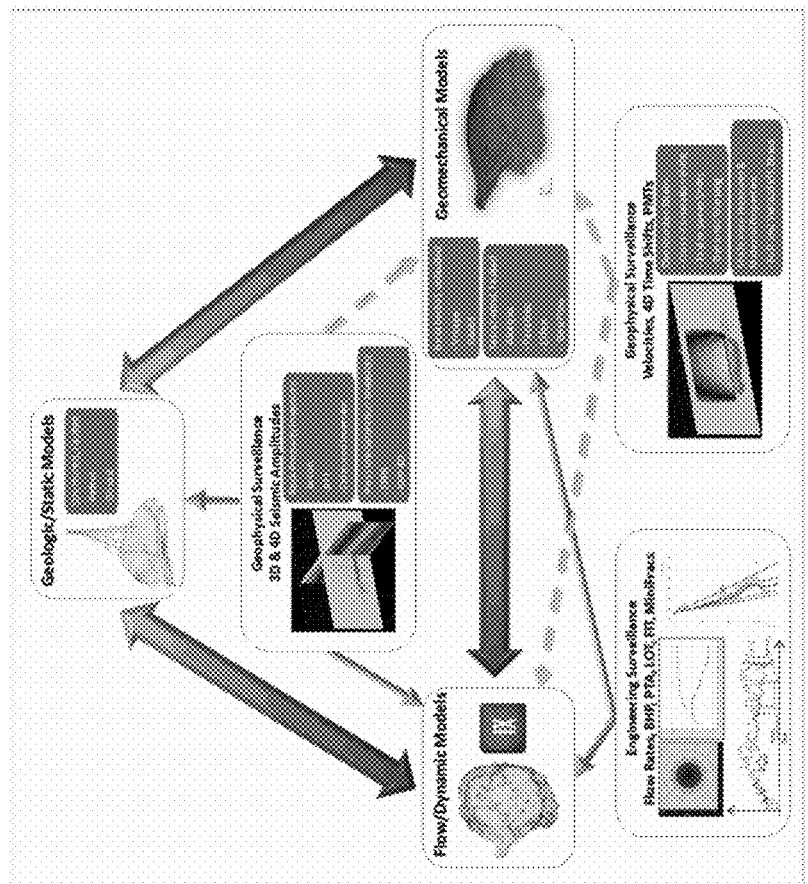
FIG. 3Y illustrates one example of a self-consistent earth model.

Lastly, FIG. 3Y illustrates one example of a self-consistent earth model.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method of generating a multi-dimensional self-consistent earth model of a subsurface formation corresponding to a portion of planet Earth, the method comprising:
   a) building a structured geologic volume of the subsurface formation, wherein the structured geologic model comprises an overburden, an underburden, an area between the overburden and the underburden, any faults, and any fractures of the subsurface formation corresponding to the portion of planet Earth and horizons representative of geologic time;
   b) generating a structured mineralogy volume of the subsurface formation corresponding to the portion of planet Earth based on the structured geologic volume, wherein the overburden, the underburden, the area between the overburden and the underburden, any faults, and any fractures of the subsurface formation are included in the structured mineralogy volume, and wherein the geologic time from the structured geologic volume is utilized in generating the structured mineralogy volume;
   c) generating a porosity volume of the subsurface formation corresponding to the portion of planet Earth based on the structured mineralogy volume that includes the overburden, the underburden, the area between the overburden and the underburden, any faults, and any fractures of the subsurface formation, and generating a density volume of the subsurface formation corresponding to the portion of planet Earth based on the porosity volume, wherein the density volume comprises a fluid density volume of at least one fluid in the subsurface formation, and wherein the density volume is generated using an equation:

$\rho_b = \Phi_t \rho_f + (1 - \Phi_t) \rho_m$, and $\rho_b$=bulk density,
   $\rho_f$=fluid density, and
   $\rho_m$=matrix density
   wherein variable $p_f$ is based on known salinity and hydrocarbon content of fluids in the subsurface formation and variable $p_m$ is calculated from the structured mineralogy volume;
   d) generating a pressure volume of the subsurface formation corresponding to the portion of planet Earth based on the density volume by generating an overburden pressure based on the density volume, and using the overburden pressure to generate the pressure volume;
   e) generating a geophysical property volume of the subsurface formation corresponding to the portion of planet Earth based on the structured geologic volume, the structured mineralogy volume, the pressure volume, the density volume, and the porosity volume, wherein the geophysical property volume is representative of geophysical dynamic elastic properties associated with in situ stress and hydrocarbon production of the subsurface formation;
   f) generating mechanical static elastic properties of the subsurface formation corresponding to the portion of planet Earth based on (i) a static to dynamic elastic property relationship with the overburden, the underburden, the area between the overburden and the underburden, any faults, and any fractures of the subsurface formation and (ii) the geophysical property volume; and
   g) performing mechanical earth modeling as a function of hydrocarbon production using the mechanical static elastic properties, the density volume, and the pressure volume to generate the multi-dimensional self-consistent earth model of the subsurface formation comprising the overburden, the underburden, the area between the overburden and the underburden, any faults, and any fractures corresponding to the portion of planet Earth.

2. The method of claim 1, further comprising:
   generating a stratigraphic ages volume to determine rates of sedimentation for each respective interval in the structured geologic volume; and
   using the stratigraphic ages volume to create a eustacy model to relate sea level changes to rates of mineral content in the structured mineralogy volume.

3. The method of claim 2, further comprising generating the porosity volume from the stratigraphic ages volume.

4. The method of claim 1, further comprising:
incorporating a reservoir model generated for a hydrocarbon flow simulation model into the structural geologic model, and
using measurements of subsurface deformation, using measurements of subsurface stresses, or any combination thereof to calibrate the multi-dimensional self-consistent earth model.

5. The method of claim 1, further comprising:
generating an anisotropy volume; and
updating the anisotropy volume to include anisotropy in the multi-dimensional self-consistent earth model.

6. The method of claim 1, further comprising:
calibrating a seismic interval velocity volume to the geophysical property volume; and
updating the density volume, the pressure volume, the porosity volume, or any combination thereof.

7. The method of claim 1, further comprising:
using a 4D Mechanical Earth Model to estimate stresses as a function of time or production;
using 4D Mechanical Earth Model results, including stress, strain, and mechanical properties, to iteratively update the geophysical property volume, the density volume, the pressure volume, the porosity volume, or any combination thereof; and
optionally using measurements of subsurface deformation, using measurements of subsurface stresses, or any combination thereof to calibrate the 4D Mechanical Earth Model results, and updating the mechanical properties, updating the pressure volume, or any combination thereof, and using the updated mechanical properties to update the geophysical property volume, the density volume, the porosity volume, or any combination thereof.

8. The method of claim 7, further comprising using the 4D Mechanical Earth Modeling results, including the stress, strain, and mechanical properties, at specified time steps to model 4D seismic time lapse response due to production.

9. The method of claim 7, further comprising using the 4D Mechanical Earth Modeling results, including the stress, strain, and mechanical properties, at specified time steps to improve a velocity model for 3D seismic imaging.

10. The method of claim 1, wherein the structured geologic volume of the subsurface formation comprises an overburden, and wherein the pressure volume is generated based on the density volume and the overburden.

11. The method of claim 1, wherein the mechanical static elastic properties are generated based on a transform of the geophysical property volume from a dynamic to a static domain.

12. The method of claim 1, further comprising using a mathematical formulation to iteratively update the pressure volume, a P-wave velocity volume, a S-wave velocity volume, the density volume, or any combination thereof and update the multi-dimensional self-consistent earth model.

13. The method of claim 12, wherein iteratively updating the pressure volume includes using a stress volume of the multi-dimensional self-consistent earth model or a stress volume of a different earth model instead of the density volume.

14. A computer system, comprising:
one or more processors;
memory; and
one or more programs, wherein the one or more programs are stored in the memory and configured to be executed by the one or more processors, the one or more programs including instructions that when executed by the one or more processors cause the device to execute a method of generating a multi-dimensional self-consistent earth model of a subsurface formation corresponding to a portion of planet Earth, the method comprising:

a) building a structured geologic volume of the subsurface formation, wherein the structured geologic model comprises an overburden, an underburden, an area between the overburden and the underburden, any faults, and any fractures of the subsurface formation corresponding to the portion of planet Earth and horizons representative of geologic time;

b) generating a structured mineralogy volume of the subsurface formation corresponding to the portion of planet Earth based on the structured geologic volume, wherein the overburden, the underburden, the area between the overburden and the underburden, any faults, and any fractures of the subsurface formation are included in the structured mineralogy volume, and wherein the geologic time from the structured geologic volume is utilized in generating the structured mineralogy volume;

c) generating a porosity volume of the subsurface formation corresponding to the portion of planet Earth based on the structured mineralogy volume that includes the overburden, the underburden, the area between the overburden and the underburden, any faults, and any fractures of the subsurface formation, and generating a density volume of the subsurface formation corresponding to the portion of planet Earth based on the porosity volume, wherein the density volume comprises a fluid density volume of at least one fluid in the subsurface formation and wherein the density volume is generated using an equation:

$$\rho_b = \Phi_t \rho_f + (1-\Phi_t)\rho_m, \text{ and}$$

$\rho_b$=bulk density,
$\rho_f$=fluid density, and
$\rho_m$=matrix density wherein variable $p_f$ is based on known salinity and hydrocarbon content of fluids in the subsurface formation and variable $p_m$ is calculated from the structured mineralogy volume;

d) generating a pressure volume of the subsurface formation corresponding to the portion of planet Earth based on the density volume by generating an overburden pressure based on the density volume, and using the overburden pressure to generate the pressure volume;

e) generating a geophysical property volume of the subsurface formation corresponding to the portion of planet Earth based on the structured geologic volume, the structured mineralogy volume, the pressure volume, the density volume, and the porosity volume, wherein the geophysical property volume is representative of geophysical dynamic elastic properties associated with in situ stress and hydrocarbon production of the subsurface formation;

f) generating mechanical static elastic properties of the subsurface formation corresponding to the portion of planet Earth based on (i) a static to dynamic elastic property relationship with the overburden, the underburden, the area between the overburden and the underburden, any faults, and any fractures of the subsurface formation and (ii) the geophysical property volume; and g) performing mechanical earth modeling as a function of hydrocarbon production using the mechanical static elastic properties, the density volume, and the pressure volume to generate the multi-dimensional self-consistent earth model of the subsurface formation comprising the overburden, the underburden, the area between the overburden and the underburden, any faults, and any fractures corresponding to the portion of planet Earth.

15. The system of claim 14, wherein the one or more programs include instructions that when executed by the one or more processors cause the device to:
   generate a stratigraphic ages volume to determine rates of sedimentation for each respective interval in the structured geologic volume; and
   use the stratigraphic ages volume to create a eustacy model to relate sea level changes to rates of mineral content in the structured mineralogy volume.

16. The system of claim 15, wherein the one or more programs include instructions that when executed by the one or more processors cause the device to generate the porosity volume from the stratigraphic ages volume.

17. The system of claim 14, wherein the one or more programs include instructions that when executed by the one or more processors cause the device to:
   incorporate a reservoir model generated for a hydrocarbon flow simulation model into the structural geologic model; and
   use measurements of subsurface deformation, use measurements of subsurface stresses, or any combination thereof to calibrate the multi-dimensional self-consistent earth model.

18. The system of claim 14, wherein the one or more programs include instructions that when executed by the one or more processors cause the device to:
   generate an anisotropy volume; and
   update the anisotropy volume to include anisotropy in the multi-dimensional self-consistent earth model.

19. The system of claim 14, wherein the one or more programs include instructions that when executed by the one or more processors cause the device to:
   calibrate a seismic interval velocity volume to the geophysical property volume; and
   update the density volume, the pressure volume, the porosity volume, or any combination thereof.

20. The system of claim 14, wherein the one or more programs include instructions that when executed by the one or more processors cause the device to:
   use a 4D Mechanical Earth Model to estimate stresses as a function of time or production;
   use 4D Mechanical Earth Model results, including stress, strain, and mechanical properties, to iteratively update the geophysical property volume, the density volume, the pressure volume, the porosity volume, or any combination thereof; and
   optionally use measurements of subsurface deformation, use measurements of subsurface stresses, or any combination thereof to calibrate the 4D Mechanical Earth Model results, and update the mechanical properties, updating the pressure volume, or any combination thereof, and use the updated mechanical properties to update the geophysical property volume, the density volume, the porosity volume, or any combination thereof.

21. The system of claim 20, wherein the one or more programs include instructions that when executed by the one or more processors cause the device to use the 4D Mechanical Earth Modeling results, including the stress, strain, and mechanical properties, at specified time steps to model 4D seismic time lapse response due to production.

22. The system of claim 20, wherein the one or more programs include instructions that when executed by the one or more processors cause the device to use the 4D Mechanical Earth Modeling results, including the stress, strain, and mechanical properties, at specified time steps to improve a velocity model for 3D seismic imaging.

23. The system of claim 14, wherein the structured geologic volume of the subsurface formation comprises an overburden, and wherein the pressure volume is generated based on the density volume and the overburden.

24. The system of claim 14, wherein the mechanical static elastic properties are generated based on a transform of the geophysical property volume from a dynamic to a static domain.

25. The system of claim 14, wherein the one or more programs include instructions that when executed by the one or more processors cause the device to use a mathematical formulation to iteratively update the pressure volume, a P-wave velocity volume, a S-wave velocity volume, the density volume, or any combination thereof and update the self-consistent earth model.

26. The system of claim 25, wherein iteratively updating the pressure volume includes using a stress volume of the multi-dimensional self-consistent earth model or a stress volume of a different earth model instead of the density volume.

27. A non-transitory computer readable storage medium storing one or more programs, the one or more programs comprising instructions, which when executed by an electronic device with one or more processors and memory, cause the device to execute a method of generating a multi-dimensional self-consistent earth model of a subsurface formation corresponding to a portion of planet Earth, the method comprising:
   a) building a structured geologic volume of the subsurface formation, wherein the structured geologic model comprises an overburden, an underburden, an area between the overburden and the underburden, any faults, and any fractures of the subsurface formation corresponding to the portion of planet Earth and horizons representative of geologic time;
   b) generating a structured mineralogy volume of the subsurface formation corresponding to the portion of planet Earth based on the structured geologic volume, wherein the overburden, the underburden, the area between the overburden and the underburden, any faults, and any fractures of the subsurface formation are included in the structured mineralogy volume, and wherein the geologic time from the structured geologic volume is utilized in generating the structured mineralogy volume;
   c) generating a porosity volume of the subsurface formation corresponding to the portion of planet Earth based on the structured mineralogy volume that includes the overburden, the underburden, the area between the overburden and the underburden, any faults, and any fractures of the subsurface formation, and generating a density volume of the subsurface formation corresponding to the portion of planet Earth based on the porosity volume, wherein the density volume comprises a fluid density volume of at least one fluid in the subsurface formation and wherein the density volume is generated using an equation;

$$\rho_b = \Phi_t \rho_f + (1-\Phi_t)\rho_m, \text{ and}$$

$\rho_b$=bulk density,
$\rho_f$=fluid density, and
$\rho_m$=matrix density
wherein variable $p_f$ is based on known salinity and hydrocarbon content of fluids in the subsurface formation and variable $p_m$ is calculated from the structured mineralogy volume;

d) generating a pressure volume of the subsurface formation corresponding to the portion of planet Earth based on the density volume by generating an overburden pressure based on the density volume, and using the overburden pressure to generate the pressure volume;

e) generating a geophysical property volume of the subsurface formation corresponding to the portion of planet Earth based on the structured geologic volume, the structured mineralogy volume, the pressure volume, the density volume, and the porosity volume, wherein the geophysical property volume is representative of geophysical dynamic elastic properties associated with in situ stress and hydrocarbon production of the subsurface formation;

f) generating mechanical static elastic properties of the subsurface formation corresponding to the portion of planet Earth based on (i) a static to dynamic elastic property relationship with the overburden, the underburden, the area between the overburden and the underburden, any faults, and any fractures of the subsurface formation and (ii) the geophysical property volume; and g) performing mechanical earth modeling as a function of hydrocarbon production using the mechanical static elastic properties, the density volume, and the pressure volume to generate the multi-dimensional self-consistent earth model of the subsurface formation comprising the overburden, the underburden, the area between the overburden and the underburden, any faults, and any fractures corresponding to the portion of planet Earth.

28. The method of claim 1, wherein the multi-dimensional self-consistent earth model is three dimensional (3D) or four dimensional (4D).

* * * * *